US008972394B1

(12) United States Patent
Tong et al.

(10) Patent No.: US 8,972,394 B1
(45) Date of Patent: *Mar. 3, 2015

(54) GENERATING A RELATED SET OF DOCUMENTS FOR AN INITIAL SET OF DOCUMENTS

(71) Applicant: Google Inc., Mountain View, CA (US)

(72) Inventors: Simon Tong, Mountain View, CA (US);
Benjamin N. Lee, Sunnyvale, CA (US);
Eric E. Altendorf, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,363

(22) Filed: May 20, 2013

Related U.S. Application Data

(63) Continuation of application No. 12/506,203, filed on Jul. 20, 2009, now Pat. No. 8,447,760.

(51) Int. Cl.
*G06F 17/30* (2006.01)

(52) U.S. Cl.
CPC .................................. *G06F 17/3053* (2013.01)
USPC ......................................... 707/728; 707/748

(58) Field of Classification Search
USPC ................................................. 707/728, 748
See application file for complete search history.

(56) References Cited

U.S. PATENT DOCUMENTS

| 5,265,065 | A | 11/1993 | Turtle |
| 5,488,725 | A | 1/1996 | Turtle et al. |
| 5,696,962 | A | 12/1997 | Kupiec |
| 5,920,854 | A | 7/1999 | Kirsch et al. |
| 5,963,940 | A | 10/1999 | Liddy et al. |

(Continued)

FOREIGN PATENT DOCUMENTS

| WO | WO 00/77689 | 12/2000 |
| WO | WO 01/16807 | 3/2001 |

(Continued)

OTHER PUBLICATIONS

Agichtein, et al; Improving Web Search Ranking by Incorporating User Behavoir Information; Aug. 2006; Proceedings of the Twenty-Ninth Annual International ACM SIGIR Conference on Research and Development in Information Retrieval, p. 19-26.

(Continued)

*Primary Examiner* — Apu Mofiz
*Assistant Examiner* — Cindy Nguyen
(74) *Attorney, Agent, or Firm* — Fish & Richardson P.C.

(57) ABSTRACT

Methods, systems, and apparatus, including computer programs encoded on computer storage media, for identifying one or more second documents related to one or more first documents. Strength of relationship scores between candidate documents in a group of candidate documents and each first document are determined by aggregating user selection data for users, the user selection data indicating, for each user, whether the user viewed the candidate document during a window of time after the first document is presented to the user on a search results web page in response to a query. An aggregate strength of relationship score is calculated for each candidate document from the strength of relationship scores for the candidate document. Second documents are selected from the candidate documents according to the aggregate strength of relationship scores for the candidate documents.

29 Claims, 17 Drawing Sheets

(56) References Cited

U.S. PATENT DOCUMENTS

| | | |
|---|---|---|
| 6,006,222 A | 12/1999 | Culliss |
| 6,006,225 A | 12/1999 | Bowman et al. |
| 6,014,665 A | 1/2000 | Culliss |
| 6,026,388 A | 2/2000 | Liddy et al. |
| 6,067,565 A | 5/2000 | Horvitz |
| 6,078,916 A | 6/2000 | Culliss |
| 6,078,917 A | 6/2000 | Paulsen et al. |
| 6,088,692 A | 7/2000 | Driscoll |
| 6,134,532 A | 10/2000 | Lazarus et al. |
| 6,182,066 B1 | 1/2001 | Marques |
| 6,182,068 B1 | 1/2001 | Culliss |
| 6,185,559 B1 | 2/2001 | Brin et al. |
| 6,249,252 B1 | 6/2001 | Dupray |
| 6,269,368 B1 | 7/2001 | Diamond |
| 6,285,999 B1 | 9/2001 | Page |
| 6,321,228 B1 | 11/2001 | Crandall et al. |
| 6,327,590 B1 | 12/2001 | Chidlovskii et al. |
| 6,341,283 B1 | 1/2002 | Yamakawa et al. |
| 6,353,849 B1 | 3/2002 | Linsk |
| 6,363,378 B1 | 3/2002 | Conklin et al. |
| 6,370,526 B1 | 4/2002 | Agrawal et al. |
| 6,421,675 B1 | 7/2002 | Ryan et al. |
| 6,473,752 B1 | 10/2002 | Fleming, III |
| 6,480,843 B2 | 11/2002 | Li |
| 6,490,575 B1 | 12/2002 | Berstis |
| 6,526,440 B1 | 2/2003 | Bharat |
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,615,209 B1 | 9/2003 | Gomes et al. |
| 6,623,529 B1 | 9/2003 | Lakritz |
| 6,640,218 B1 | 10/2003 | Golding et al. |
| 6,658,423 B1 | 12/2003 | Pugh et al. |
| 6,671,681 B1 | 12/2003 | Emens et al. |
| 6,678,681 B1 | 1/2004 | Brin et al. |
| 6,701,309 B1 | 3/2004 | Beeferman et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,816,850 B2 | 11/2004 | Culliss |
| 6,853,993 B2 | 2/2005 | Ortega et al. |
| 6,873,982 B1 | 3/2005 | Bates et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,912,505 B2 | 6/2005 | Linden et al. |
| 6,944,611 B2 | 9/2005 | Flank et al. |
| 6,944,612 B2 | 9/2005 | Roustant et al. |
| 6,954,750 B2 | 10/2005 | Bradford |
| 6,963,867 B2 | 11/2005 | Ford et al. |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 | 9/2006 | Chou et al. |
| 7,117,206 B1 | 10/2006 | Bharat et al. |
| 7,136,849 B2 | 11/2006 | Patrick |
| 7,146,361 B2 | 12/2006 | Broder et al. |
| 7,222,127 B1 | 5/2007 | Bem et al. |
| 7,231,399 B1 | 6/2007 | Bem et al. |
| 7,243,102 B1 | 7/2007 | Naam et al. |
| 7,249,126 B1 | 7/2007 | Ginsburg et al. |
| 7,266,765 B2 | 9/2007 | Golovchinsky et al. |
| 7,293,016 B1 | 11/2007 | Shakib et al. |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,451,487 B2 | 11/2008 | Oliver et al. |
| 7,499,919 B2 | 3/2009 | Meyerzon et al. |
| 7,505,964 B2 | 3/2009 | Tong et al. |
| 7,516,146 B2 | 4/2009 | Robertson et al. |
| 7,526,470 B1 | 4/2009 | Karnawat et al. |
| 7,533,092 B2 | 5/2009 | Berkhin et al. |
| 7,533,130 B2 | 5/2009 | Narayana et al. |
| 7,552,112 B2 | 6/2009 | Jhala et al. |
| 7,565,363 B2 | 7/2009 | Anwar |
| 7,565,367 B2 | 7/2009 | Barrett et al. |
| 7,566,363 B2 | 7/2009 | Starling et al. |
| 7,574,530 B2 | 8/2009 | Wang et al. |
| 7,584,181 B2 | 9/2009 | Zeng et al. |
| 7,603,350 B1 | 10/2009 | Guha |
| 7,610,282 B1 | 10/2009 | Datar et al. |
| 7,636,714 B1 | 12/2009 | Lamping et al. |
| 7,657,626 B1 | 2/2010 | Zwicky |
| 7,676,507 B2 | 3/2010 | Maim |
| 7,680,775 B2 | 3/2010 | Levin et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,783,632 B2 | 8/2010 | Richardson et al. |
| 7,801,885 B1 | 9/2010 | Verma |
| 7,809,716 B2 | 10/2010 | Wang et al. |
| 7,818,315 B2 | 10/2010 | Cucerzan et al. |
| 7,818,320 B2 | 10/2010 | Makeev |
| 7,836,058 B2 | 11/2010 | Chellapilla et al. |
| 7,844,589 B2 | 11/2010 | Wang et al. |
| 7,849,089 B2 | 12/2010 | Zhang et al. |
| 7,853,557 B2 | 12/2010 | Schneider et al. |
| 7,856,446 B2 | 12/2010 | Brave et al. |
| 7,860,886 B2 | 12/2010 | Loftesness |
| 7,877,404 B2 | 1/2011 | Achan et al. |
| 7,895,177 B2 | 2/2011 | Wu |
| 7,925,498 B1 | 4/2011 | Baker et al. |
| 7,925,649 B2 | 4/2011 | Jeh et al. |
| 7,953,740 B1 | 5/2011 | Vadon et al. |
| 7,974,974 B2 | 7/2011 | Tankovich et al. |
| 7,987,185 B1 | 7/2011 | Mysen et al. |
| 8,001,136 B1 | 8/2011 | Upstill et al. |
| 8,019,650 B2 | 9/2011 | Donsbach et al. |
| 8,024,326 B2 | 9/2011 | Tong et al. |
| 8,024,330 B1 | 9/2011 | Franco et al. |
| 8,027,439 B2 | 9/2011 | Zoldi et al. |
| 8,037,042 B2 | 10/2011 | Anderson et al. |
| 8,037,043 B2 | 10/2011 | Zoeter et al. |
| 8,037,086 B1 | 10/2011 | Upstill et al. |
| 8,051,061 B2 | 11/2011 | Niu et al. |
| 8,060,456 B2 | 11/2011 | Gao et al. |
| 8,060,497 B1 | 11/2011 | Zatsman et al. |
| 8,065,296 B1 | 11/2011 | Franz et al. |
| 8,069,182 B2 | 11/2011 | Pieper |
| 8,073,263 B2 | 12/2011 | Hull et al. |
| 8,073,772 B2 | 12/2011 | Bishop et al. |
| 8,073,867 B2 | 12/2011 | Chowdhury |
| 8,082,242 B1 | 12/2011 | Mysen et al. |
| 8,086,282 B2 | 12/2011 | Hellberg |
| 8,086,599 B1 | 12/2011 | Heymans |
| 8,090,717 B1 | 1/2012 | Bharat et al. |
| 8,156,111 B2 | 4/2012 | Jones et al. |
| 8,224,827 B2 | 7/2012 | Dean et al. |
| 8,239,370 B2 | 8/2012 | Wong et al. |
| 8,396,865 B1 | 3/2013 | Ie et al. |
| 8,412,699 B1 | 4/2013 | Mukherjee et al. |
| 8,447,760 B1 | 5/2013 | Tong et al. |
| 8,458,165 B2 | 6/2013 | Liao et al. |
| 8,498,974 B1 | 7/2013 | Kim et al. |
| 8,521,725 B1 | 8/2013 | Pearson et al. |
| 8,583,636 B1 | 11/2013 | Franz et al. |
| 8,661,029 B1 * | 2/2014 | Kim et al. ............... 707/723 |
| 8,738,596 B1 | 5/2014 | Kim et al. |
| 2001/0000356 A1 | 4/2001 | Woods |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |

(56) References Cited

U.S. PATENT DOCUMENTS

| | | |
|---|---|---|
| 2003/0009399 A1 | 1/2003 | Boerner |
| 2003/0018707 A1 | 1/2003 | Flocken |
| 2003/0028529 A1 | 2/2003 | Cheung et al. |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 | 9/2003 | Odom et al. |
| 2003/0187837 A1 | 10/2003 | Culliss |
| 2003/0195877 A1 | 10/2003 | Ford et al. |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1 | 1/2004 | Loofbourrow et al. |
| 2004/0006740 A1 | 1/2004 | Krohn et al. |
| 2004/0034632 A1 | 2/2004 | Carmel et al. |
| 2004/0049486 A1 | 3/2004 | Scanlon et al. |
| 2004/0059708 A1 | 3/2004 | Dean et al. |
| 2004/0083205 A1 | 4/2004 | Yeager |
| 2004/0093325 A1 | 5/2004 | Banerjee et al. |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0186996 A1 | 9/2004 | Gibbs et al. |
| 2004/0199419 A1 | 10/2004 | Kim et al. |
| 2004/0215607 A1 | 10/2004 | Travis, Jr. |
| 2005/0015366 A1 | 1/2005 | Carrasco et al. |
| 2005/0021397 A1 | 1/2005 | Cui et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0102282 A1 | 5/2005 | Linden |
| 2005/0125376 A1 | 6/2005 | Curtis et al. |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0222998 A1 | 10/2005 | Driessen et al. |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0036593 A1 | 2/2006 | Dean et al. |
| 2006/0047643 A1 | 3/2006 | Chaman |
| 2006/0069667 A1 | 3/2006 | Manasse et al. |
| 2006/0074903 A1 | 4/2006 | Meyerzon et al. |
| 2006/0089926 A1 | 4/2006 | Knepper et al. |
| 2006/0095421 A1 | 5/2006 | Nagai et al. |
| 2006/0106793 A1 | 5/2006 | Liang |
| 2006/0123014 A1 | 6/2006 | Ng |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0200556 A1 | 9/2006 | Brave et al. |
| 2006/0227992 A1 | 10/2006 | Rathus et al. |
| 2006/0230040 A1 | 10/2006 | Curtis et al. |
| 2006/0259467 A1 | 11/2006 | Westphal |
| 2006/0259476 A1 | 11/2006 | Kadayam et al. |
| 2006/0293950 A1 | 12/2006 | Meek et al. |
| 2007/0005575 A1 | 1/2007 | Dai et al. |
| 2007/0005588 A1 | 1/2007 | Zhang et al. |
| 2007/0038659 A1 | 2/2007 | Datar et al. |
| 2007/0050339 A1 | 3/2007 | Kasperski et al. |
| 2007/0061195 A1 | 3/2007 | Liu et al. |
| 2007/0061211 A1 | 3/2007 | Ramer et al. |
| 2007/0081197 A1 | 4/2007 | Omoigui |
| 2007/0106659 A1 | 5/2007 | Lu et al. |
| 2007/0112730 A1 | 5/2007 | Gulli et al. |
| 2007/0130370 A1 | 6/2007 | Akaezuwa |
| 2007/0156677 A1 | 7/2007 | Szabo |
| 2007/0172155 A1 | 7/2007 | Guckenberger |
| 2007/0180355 A1 | 8/2007 | McCall et al. |
| 2007/0192190 A1 | 8/2007 | Granville |
| 2007/0208730 A1 | 9/2007 | Agichtein et al. |
| 2007/0214131 A1 | 9/2007 | Cucerzan et al. |
| 2007/0233653 A1 | 10/2007 | Biggs et al. |
| 2007/0255689 A1 | 11/2007 | Sun et al. |
| 2007/0260596 A1 | 11/2007 | Koran et al. |
| 2007/0260597 A1 | 11/2007 | Cramer et al. |
| 2007/0266021 A1 | 11/2007 | Aravamudan et al. |
| 2007/0266439 A1 | 11/2007 | Kraft |
| 2007/0288450 A1 | 12/2007 | Datta et al. |
| 2008/0010143 A1 | 1/2008 | Kniaz et al. |
| 2008/0027913 A1 | 1/2008 | Chang et al. |
| 2008/0052219 A1 | 2/2008 | Sandholm et al. |
| 2008/0052273 A1 | 2/2008 | Pickens |
| 2008/0059453 A1 | 3/2008 | Laderman |
| 2008/0077570 A1 | 3/2008 | Tang et al. |
| 2008/0082518 A1 | 4/2008 | Loftesness |
| 2008/0091650 A1 | 4/2008 | Fontoura et al. |
| 2008/0104043 A1 | 5/2008 | Garg et al. |
| 2008/0114624 A1 | 5/2008 | Kitts |
| 2008/0114729 A1 | 5/2008 | Raman et al. |
| 2008/0114750 A1 | 5/2008 | Saxena et al. |
| 2008/0140699 A1 | 6/2008 | Jones et al. |
| 2008/0162475 A1 | 7/2008 | Meggs et al. |
| 2008/0183660 A1 | 7/2008 | Szulcewski |
| 2008/0189269 A1 | 8/2008 | Olsen |
| 2008/0208825 A1 | 8/2008 | Curtis et al. |
| 2008/0228442 A1 | 9/2008 | Lippincott et al. |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0006438 A1 | 1/2009 | Tunkelang et al. |
| 2009/0012969 A1 | 1/2009 | Rail et al. |
| 2009/0055392 A1 | 2/2009 | Gupta et al. |
| 2009/0070194 A1 | 3/2009 | Song |
| 2009/0157643 A1 | 6/2009 | Gollapudi et al. |
| 2009/0182723 A1 | 7/2009 | Shnitko et al. |
| 2009/0187557 A1 | 7/2009 | Hansen et al. |
| 2009/0228442 A1 | 9/2009 | Adams et al. |
| 2009/0287656 A1 | 11/2009 | Bennett |
| 2009/0313242 A1 | 12/2009 | Kodama |
| 2010/0106706 A1 | 4/2010 | Rorex et al. |
| 2010/0131563 A1 | 5/2010 | Yin |
| 2010/0205541 A1 | 8/2010 | Rapaport et al. |
| 2010/0228738 A1 | 9/2010 | Mehta et al. |
| 2010/0241472 A1 | 9/2010 | Hernandez |
| 2010/0299317 A1 | 11/2010 | Uy |
| 2010/0325131 A1 | 12/2010 | Dumais et al. |
| 2011/0179093 A1 | 7/2011 | Pike et al. |
| 2011/0219025 A1 | 9/2011 | Lipson et al. |
| 2011/0264670 A1 | 10/2011 | Banerjee et al. |
| 2011/0282906 A1 | 11/2011 | Wong |
| 2011/0295844 A1 | 12/2011 | Sun et al. |
| 2011/0295879 A1 | 12/2011 | Logis et al. |
| 2012/0011148 A1 | 1/2012 | Rathus et al. |
| 2012/0191705 A1 | 7/2012 | Tong et al. |

FOREIGN PATENT DOCUMENTS

| | | |
|---|---|---|
| WO | WO 01/67297 | 9/2001 |
| WO | WO2004/059514 | 7/2004 |

OTHER PUBLICATIONS

Agichtein, et al; Learning User Interaction Models for Predicting Web Search Results Performances; Aug. 2006; Proceedings of the Twenty-Ninth Annual International ACM SIGIR Conference on Research and Development in Information Retrieval, p. 3-10.

Boyan et al.; A Machine Learning Architecture for Optimizing Web Search Engines; Aug. 1996; Internet-based information systems—Workshop Technical Report—American Association for Artificial Intelligence, p. 1-8.

Burke, Robin, Integrating Knowledge'based and Collaboratice-filtering Recommender Systems, AAAI Technical Report WS-99-01. Compilation copyright © 1999, AAAI (www.aaai.org), pp. 69-72.

(56) References Cited

OTHER PUBLICATIONS

Cutrell, et al.; Eye tracking in MSN Search: Investigating snippet length, target position and task types, 2007, Conference on Human Factors in Computing Systems—Proceedings of the SIGCHI Conference on Human Factors in Computing Systems.

Diligenti, et al., Users, Queries and Documents: A Unified Representation for Web Mining, wi-iat, vol. 1, 2009 IEEE/WIC/ACM International Joint Conference on Web Intelligence and Intelligent Agent Technology, 2009, pp. 238-244.

Gröar, Miha, User Profiling: Collaborative Filtering, SIKDD 2004, Oct. 12-15, 2004, Ljubljana, Slovenia, 4 pages.

Hofman, Thomas, Latent Semantic Models for Collaborative Filtering, ACM Transactions on Information Systems, vol. 22, No. 1, Jan. 2004, pp. 89-115.

Jansen at al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-28, 2003, 5 pages.

Joachims, "Evaluating Search Engines Using Clickthrough Data", Cornell University, Department of Computer Science, Draft, Feb. 19, 2002, 13 pages.

Joachims; Optimizing search engines using clickthrough data; 2002; Proceedings of the ACM SIGKDD International Conference on Knowledge Discovery and Data Mining, p. 133-142, 10 pages.

Kelly, et al., Implicit Feedback for Inferring User Preference: A Bibliograpi SIGIR Forum, vol. 37, No. 2 (2003), pp. 18-28.

Lemire, Daniel, Scale and Translation Invariant Collaborative Filtering Systems, Published in Information Retrieval, 8 (1), pp. 129-150, 2005.

Linden, Greg et al., Amazon.com Recommendations: Item-to-Item Collaborative Filtering, [online], http://computer.org/internet/, IEEE Internet Computing, Jan.-Feb. 2003, IEEE Computer Society, pp. 76-80.

Nicole, Kristen, Heeii is StumbleUpon Plus Google Suggestions. [online] Retrieved from the Internet http://mashable.com/2007/05/15/heeii/, 11 pages.

Radlinski, et al.. Query Chains: Learning to Rank from Implicit Feedback, KDD '05, Aug. 21-24, 2005, Chicago, Illinois, USA, 10 pages.

Schwab, et al., Adaptivity through Unobstructive Learning, 2002, 16(3), pp. 5-9.

Stoilova, Lubomira et al., GiveALink: Mining a Semantic Network of Bookmarks for Web Search and Recommendation, LinkKDD '05, Aug. 21, 2005, Chicago, IL, USA, 8 pages.

Xiao, et al., Measuring Similarity of Interests for Clustering Web-User, ADC, 2001, p. 107-114.

Xie et al., Web User Clustering from Access Log Using Belief Function, K-Cap '01, Oct. 22-23, 2001, Victoria, British Columbia, Canada, pp. 202-208.

Yu et al., Selecting Relevant Instances for Efficient and Accurate Collaborative Filtering, CIKM 01, Nov. 5-10, 2001, Atlanta, Georgia, pp. 239-246.

Zeng et al., Similarity Measure and instance Selection for Collaborative Filtering. WWW '03, May 20-24, 2003, Budapest, Hungary, pp. 652-658.

Soumen Chakrabarti, et al. "Enhanced Topic Distillation using Text, Markup tags, and Hyperlinks" ACM, Sep. 9-12, 2001, pp. 208-216.

Gabriel Somlo et al., "Using Web Hepler Agent Profiles in Query Generation", ACM, Jul. 2003, pp. 812-818.

Bar-Llan et al., "Presentation Bias is Significant in Determining User Preference for Search Results—A User Study"; Journal of the American Society for Information Science and Technology, vol. 60, Issue 1 (p. 135-149), Sep. 2008, 15 pages.

Bar-Llan et al.; ""Methods for comparing rankings of search engine results"", Computer Networks; The International Journal of Computer and Telecommunications Networking, Jul. 2006, vol. 50, Issue 10, 19 pages.

Boldi, et al.; The Query-flow Graph: Model and Applications: CKIM 'Oct. 26-30, Napa Valley, California, USA, pp. 609-617, copyright 2008 ACM.

Burke, Robin, Integrating Knowledge-based and Collaborative-filtering Recommender Systems, AAAI Technical Report WS-99-01. Compilation copyright © 1999, AAAU (www.aaai.org), pp. 69-72.

Craswell, et al.; Random Walks on the Click Graph; Jul. 2007; SIGIR '07, Amsterdam, the Netherlands, 8 pages.

Google News archive, Jul. 8, 2003, Webmasterworld.com, [online] Retrieved from the Internet http://www.webmasterwolrd.com/forum3/15085.htm [retrieved on Nov. 20, 2009] 3 pages.

Joachims et al., "Search Engines that Learn from Implicit Feedback"; Aug. 2007, IEEE Computer Society.

Joachims, T., Evaluating retrieval performance using clickthrough data. Proceedings of the SIGIR Workshop on Mathematical/Formal Methods in Information Retrieval; 2002, Aug. 12-15; Tampere, Finland, 18 pages.

Joachims; Optimizing search engines using clickthrough data; 2002; Proceedings of the ACM SIGKDD International Conference on Knowledge Discovery and Data Mining, p. 133-142.

U.S. Patent Office, U.S. Appl. No. 11/556,143, filed Nov. 2, 2006, in Office Action mailed Apr. 20, 2011, 18 pages.

U.S. Patent Office, U.S. Appl. No. 11/556,143, filed Nov. 2, 2006, in Office Action mailed Jan. 25, 2010, 14 pages.

U.S. Patent Office, U.S. Appl. No. 11/556,143, filed Nov. 2, 2006, in Office Action mailed Jul. 6, 2010, 20 pages.

U.S. Patent Office, U.S. Appl. No. 11/685,095, filed Mar. 12, 2007, in Office Action mailed Apr. 13, 2011, 31 pages.

U.S. Patent Office, U.S. Appl. No. 11/685,095, filed Mar. 12, 2007, in Office Action mailed Feb. 25, 2009, 21 pages.

U.S. Appl. No. 11/685,095, filed Mar. 12, 2007, in Office Action mailed feb. 8, 2010, 31 pages.

U.S. Patent Office, U.S. Patent Office, U.S. Appl. No. 11/685,095, filed Mar. 12, 2007, in Office Action mailed Sep. 10, 2009, 23 pages.

U.S. Patent Office, U.S. Appl. No. 11/556,086, filed Nov. 2, 2006, in Office Action mailed Jun. 23, 2010, 21 pages.

W3C, URIs, URLs and URNs: Classification and Recommendations 1.0, Report from the joint W3C/IETF URI Planing Interest Group, Sep. 21, 2001, 8 pages.

Xiao, et al., Measuring Similarity of Interests for Clustering Web-Users, ADC, 2001, pp. 107-114.

Zeng, et al., "Learning to Cluster Web Search Results", SIGIR '04, Proceedings of the 27th Annual International ACM SIGIR conference on research and development in information retrieval, 2004.

Australian Patent Office Action in AU Appl. Ser. No. 2004275274, mailed Feb. 3, 2010, 2 pages.

Dan Olsen et al., "Query-by-critique: Spoken Language Access to Large Lists", ACM, Oct. 2002, pp. 131-140.

Susan Ganch et al., "A Corpus Analysis Approach for Automatic Query Expansion and its Extension to Multiple Databases", ACM, Jul. 1999, pp. 250-269.

Nicolas Bruno et al., "Top-K Selection Queries over Relational Databases: Mapping Strategies and Performance Evaluation", ACM, Jun. 2002, pp. 153-187.

Ji-Rong Wen et al., "Query Clustering using User Logs", ACM, Jan. 2002, pp. 59-81.

Brin, S. and L. Page, The Anatomy of a Large-Scale Hypertextual Web Search Engine, Computer Science Department, Apr. 1998.

International Search Report and Written Opinion for Application No. PCT/US2004/029615, dated Jan. 19, 2005, 8 pages.

International Search Report and Written Opinion for Application No. 200806756-3, dated Nov. 19, 2010 12 pages.

Authorized Officer Athina Nickitas-Etienne, International Preliminary Report and Written Opinion for Application No. PCT/US2004/029615, mailed Mar. 23, 2006.

Indian Office Action in Indian Application No. 686/KOLNP/2006, mailed Jun. 3, 2008, 2 pages.

Danish Search Report and Written Opinion for Application No. 200601630-7, dated Jun. 21, 2007, 15 pages.

Jones., "Pictures of Relevance: A Geometric Analysis of Similarity Measures", Journal of the American Society for Information Science, Nov. 1987, 23 pages.

(56) References Cited

OTHER PUBLICATIONS

Kaplan et al., "Adaptive Hypertext Navigation Based on User Goals and Context", User Modeling and User-Adapted Interaction 2, Sep. 1, 1993; pp. 193-220, 28 pages.

Liddy et al., "A Natural Language Text Retrieval System With Relevance Feedback", 16th National Online, May 2-6, 1995, 3 pages.

"Personalizing Search via Automated Analysis of Interest and Activities," by Teevan et al. IN: SIGIR'05 (2005), 8 pages.

\* cited by examiner

GENERATING A RELATED SET OF DOCUMENTS FOR AN INITIAL SET OF DOCUMENTS

CROSS REFERENCE TO RELATED APPLICATION

This application is a continuation application of, and claims priority to, pending U.S. patent application Ser. No. 12/506,203, filed on Jul. 20, 2009, entitled "Generating a Related Set of Documents for an Initial Set of Documents". The disclosure of the foregoing application is incorporated herein by reference in its entirety.

BACKGROUND

This specification relates to generating a related group of search result documents from an initial group of search result documents.

Internet search engines provide information about Internet accessible search result documents (e.g., Web pages, images, text documents, multimedia content) that are responsive to a user's search query by returning a set of search results for the query. A search result includes, for example, a Uniform Resource Locator (URL) and a snippet of information for resources responsive to a query. Users are presented with many search results and view a subset of search result documents corresponding to the search results over time. Users may also browse various documents available on the Internet.

SUMMARY

This specification describes technologies relating to generating a related group of search result documents from an initial group of search result documents. In general, one aspect of the subject matter described in this specification can be embodied in methods for identifying one or more second documents related to one or more first documents that include the actions of determining a respective strength of relationship score between each candidate document in a group of one or more candidate documents and each first document by aggregating user selection data for users. The first documents and the candidate documents are in a corpus of web documents, and the user selection data indicates, for each user, whether the user viewed the candidate document during a window of time after the first document is presented to the user on a search results web page in response to a query. The method further includes calculating an aggregate strength of relationship score for each candidate document from the respective strength of relationship scores for the candidate document and selecting the second documents from the candidate documents according to the aggregate strength of relationship scores for the candidate documents. Other embodiments of this aspect include corresponding systems, apparatus, and computer programs recorded on computer storage devices, each configured to perform the operations of the methods.

These and other embodiments can each optionally include one or more of the following features. The user selection data can further indicate whether each user viewed the candidate document for a threshold period of time. Aggregating user selection data can further comprise scaling the user selection data for one of the users by a scoring factor when the user views the candidate document during the window of time after the first document is selected by the user from the search results web page. Determining a respective strength of relationship score between each candidate document and each first document can further comprise using a popularity of the candidate document to normalize the respective strength of relationship score. The one or more second documents can be associated with a natural language, and determining a respective strength of relationship score between each candidate document and each first document can further include scaling the strength of relationship score by a percentage of users who viewed the candidate document and are associated with the natural language.

The embodiments can further include identifying one or more documents responsive to a query as the first documents, and generating an augmented set of documents responsive to the query by including one or more of the second documents in the first documents. The embodiments can further include receiving the query and presenting the augmented set of documents in response to the query.

The embodiments can further include selecting the one or more first documents from documents a first user has viewed for a second period of time and presenting the one or more second documents as suggested documents. Presenting the one or more second documents as suggested documents can include presenting the one or more second documents in a toolbar.

The embodiments can further include receiving input from a second user indicating that one or more of the first documents are preferred documents and calculating a respective document weight for each preferred document. Calculating the aggregate strength of relationship score for each candidate document can include weighting the strength of relationship scores for the candidate document and each preferred document by the respective document weight for the preferred document. The embodiments can further include receiving input from the second user indicating that one or more of the first documents are disliked documents and calculating a respective document weight for each disliked document. Calculating the aggregate strength of relationship score for each candidate document can include weighting the strength of relationship scores for the candidate document and each disliked document by the respective document weight for the disliked document. The embodiments can further include presenting one or more of the second documents as suggested documents.

The embodiments can further include selecting the one or more first documents based on one or more first queries issued during a session, where each of the first documents is responsive to one of the first queries, identifying one or more second queries corresponding to the one or more second documents from data associating queries and documents, and presenting the one or more second queries as suggested queries.

Particular embodiments of the subject matter described in this specification can be implemented so as to realize one or more of the following advantages. A related set of "better" documents can be generated from an initial set of documents. The initial documents can be documents that a user has viewed during a search session, documents that a user has browsed (i.e., viewed), or documents that a user has bookmarked. The related set of documents can be used to generate suggested documents for a user. The related set of documents can be used to return more relevant search results in response to users, for example, through session-based ranking, where search results are ranked in the overall context of a session of user search queries, or by augmenting a set of search results responsive to a search query with other related documents. The related set of documents can be used to generate suggested queries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
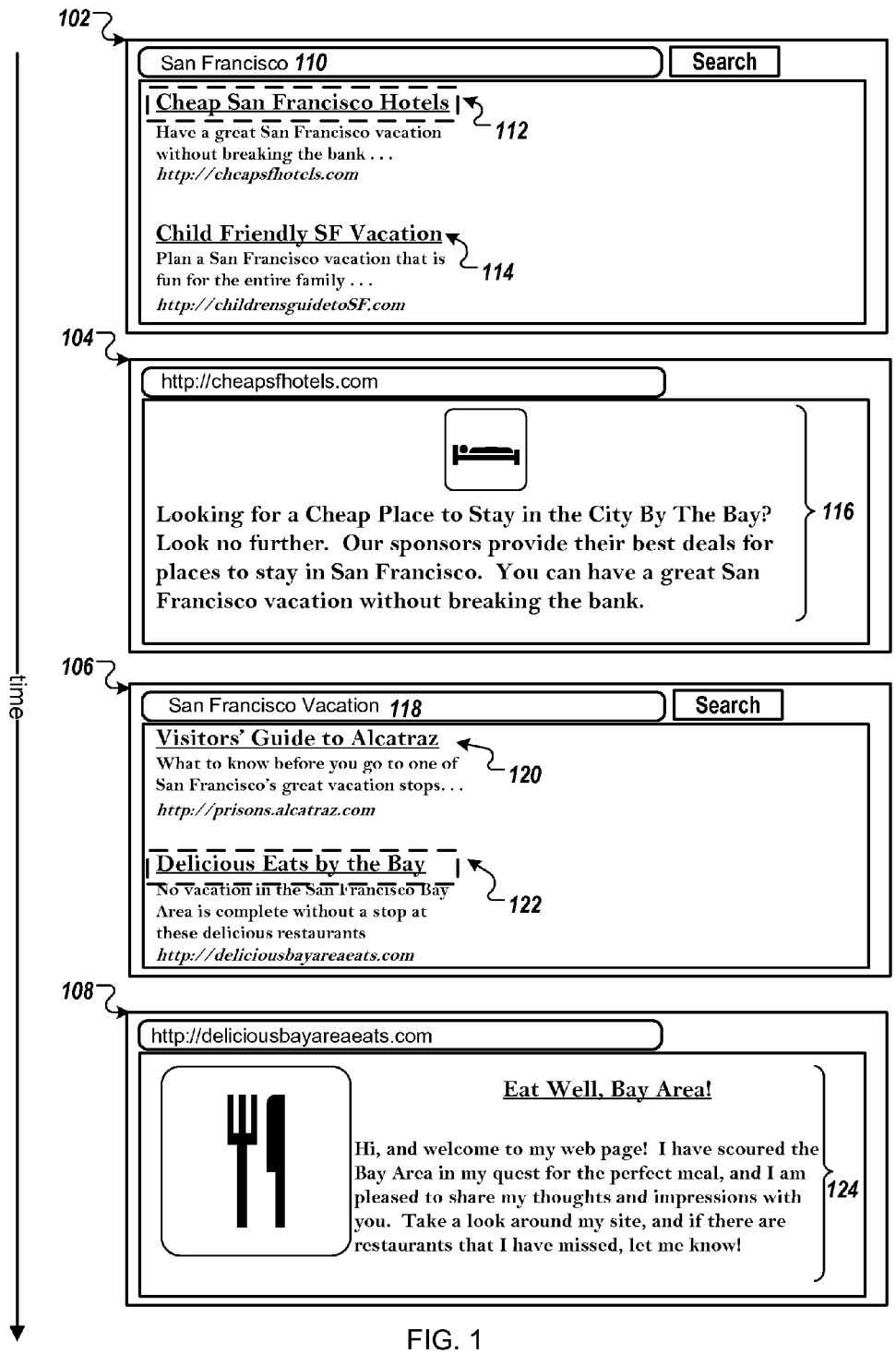
FIG. 1 illustrates an example graphical user interface that changes over time as a user interacts with documents.

FIG. 1 illustrates an example graphical user interface that changes over time as a user interacts with documents (e.g., search result documents that are Internet accessible resources indexed by a search engine). While FIG. 1 shows a visual display of search results and documents, search results and documents can be presented to the user in various ways, including through aural and haptic presentation.

First, the user issues a query 110 for "San Francisco" through the search engine user interface 102. A search engine generates relevant search results 112 and 114 and presents them to the user. The user clicks (e.g., selects with a mouse or through interaction with another input device such as, for example, a keyboard, a microphone, a camera, or a tactile input device) a search result for "Cheap San Francisco Hotels" 112, and the user interface changes to 104 and presents the document 116 corresponding to the search result selected by the user. The user views the search result document 116 for some period of time. While FIG. 1 illustrates a user visually viewing a document, viewing can include visually viewing some or all of a document, a preview of a document (e.g., a thumbnail image), listening to the document (e.g., if the document is a sound file, or is text that is converted to speech), viewing a translated version of the document (e.g., from French to English), and other techniques of receiving information in a document. Additionally, viewing a document can include other forms of indicating the usefulness of a document (e.g., saving a copy of the document, sending a copy of the document to someone, or explicitly indicating a positive or negative opinion of the document).

At a later time, the user interface changes to 106 where the user issues a new query 118 for "San Francisco Vacation." The search engine generates relevant search results 120 and 122 and presents them to the user. The user clicks search result 122 for "Delicious Eats by the Bay," and the user interface changes to 108 and displays the document 124 corresponding to the search result selected by the user. The user views the search result document 124 for some period of time.

Figure 2A:
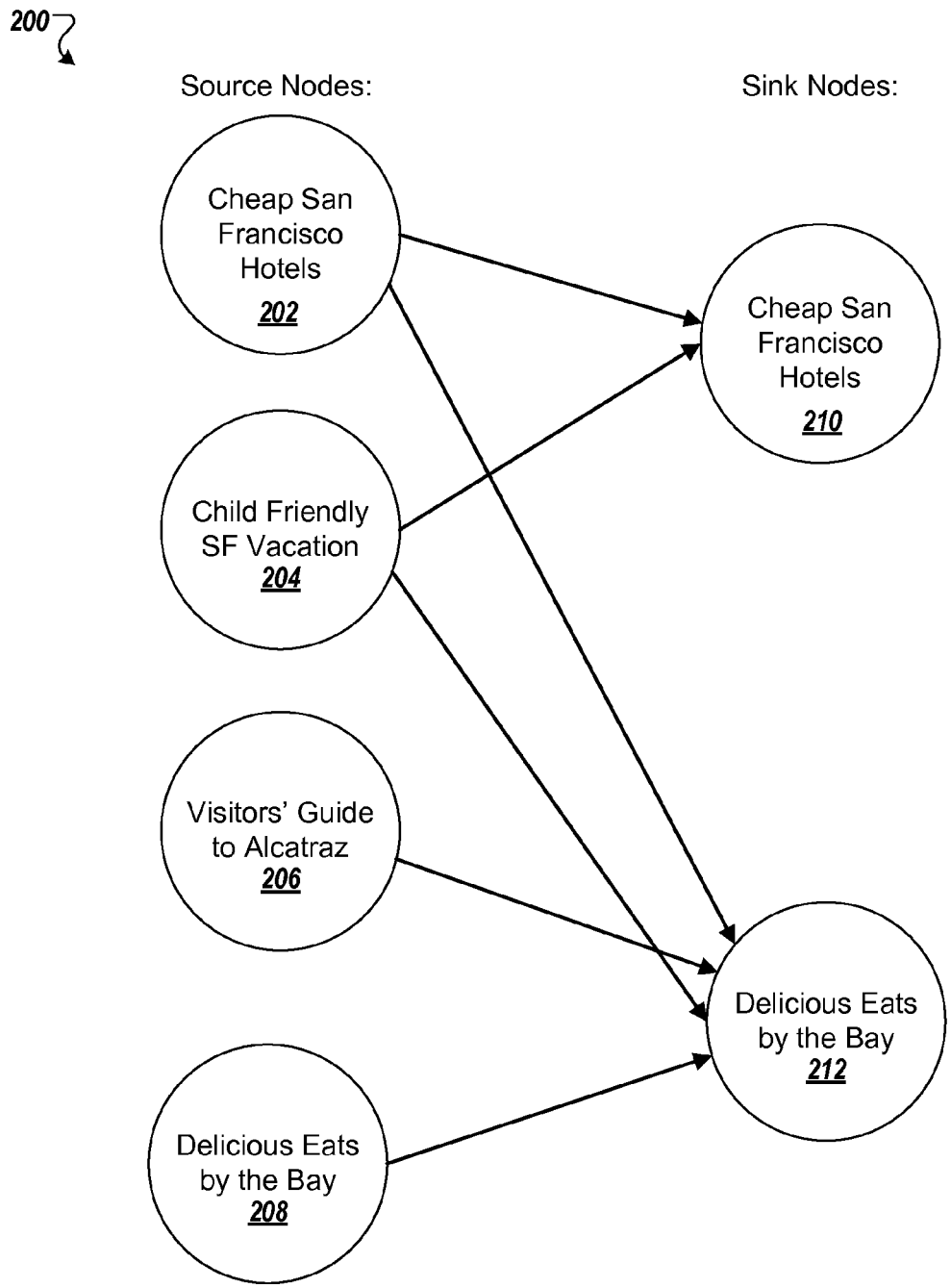
FIG. 2A is a graph that models relationships between documents based on the user's interactions with the documents as described in FIG. 1.

FIG. 2A is a graph that models relationships between documents based on the user's interactions with the documents as described in FIG. 1. The source nodes on the left hand side of the graph include four nodes, each corresponding to a document presented as a search result in FIG. 1. Node 202 corresponds to the "Cheap San Francisco Hotels" document presented as search result 112 in FIG. 1, node 204 corresponds to the "Child Friendly SF Vacation" document presented as search result 114 in FIG. 1, node 206 corresponds to the "Visitors' Guide to Alcatraz" search result document presented as search result 120 in FIG. 1, and node 208 corresponds to the "Delicious Eats by the Bay" search result document presented as search result 122 in FIG. 1. The sink nodes on the right hand side of the graph include two nodes, one for each document that the user viewed (e.g., node 210 for "Cheap San Francisco Hotels" and node 212 for "Delicious Eats by the Bay").

The directed edges from the source nodes to the sink nodes represent a relationship between the documents corresponding to the nodes. In FIG. 2A, there is a directed edge from a source node to a sink node when a search result for the document corresponding to the source node ("source search result") was presented in a set of search results and the user viewed the document corresponding to the sink node ("sink document") within a given time period after the source search result was presented to the user. For example, after the search result 114 for "Child Friendly SF Vacation" was presented in user interface 102, the user viewed two documents, "Cheap San Francisco Hotels" 116 in user interface 104 and "Delicious Eats By the Bay" 124 in user interface 108. Therefore, the graph 200 includes directed edges from the "Child Friendly SF Vacation" node 204 to both the "Cheap San Francisco Hotels" node 210 and the "Delicious Eats by the Bay" node 212. As another example, after the "Visitors Guide to Alcatraz" search result 120 was presented in user interface 106, the user viewed only one document, "Delicious Eats by the Bay" 124 in user interface 108. Therefore, the graph 200 includes only one directed edge from the Visitors Guide to Alcatraz node 206, and the edge goes to the Delicious Eats by the Bay node 212.

Various other metrics can be used to relate source nodes to sink nodes. For example, in some implementations, a given search result is considered to have been presented to a user only if the user clicks on the given search result or a search result below the given search result in the order of search results. For example, in FIG. 1, Visitors Guide to Alcatraz 120 would be considered to have been presented to the user, because the user clicked on Delicious Eats by the Bay 122 which is below the Visitors Guide to Alcatraz 120. Delicious Eats by the Bay 122 would also be considered to have been presented to the user because the user clicked on Delicious Eats by the Bay 122. However, Child Friendly SF Vacation 114 would not be considered to have been presented to the user, because the user did not click on it or any search results below it. In these implementations, there would be no edges from the child friendly SF Vacation node 204 in the graph 200. In other implementations, source nodes are related to sink nodes only when a user clicks on the search result document corresponding to the source node before viewing the search result document corresponding to the sink node. For example, in FIG. 1, the user never selected search results "Child Friendly SF Vacation" 114 or "Visitors' Guide to Alcatraz" 120. Therefore, in these implementations, the graph 200 would not include any edges from either the Child Friendly SF Vacation node 204 or the Visitors' Guide to Alcatraz node 206.

In some implementations, source nodes are related to sink nodes only when the time during which the user viewed the sink document satisfies a threshold. For example, a sink document could have to be viewed for a minimum amount of time. The minimum amount of time can be determined, for example, empirically. In other implementations, source nodes are related to sink nodes only when the time between when the user was presented with and/or clicked the source node and viewed the sink document satisfies a threshold. For example, the sink document could have to be viewed within a given time period (e.g., two hours) of visiting the source document.

In some implementations, the edges are weighted, for example, by the time the user spent viewing the sink document, or by whether the user viewed the sink document after clicking on the source document or merely being presented with the source document. For example, longer viewing times can be given a higher weight, and edges from source nodes whose source results were clicked on rather than just presented can be given a higher weight.

In some implementations the system maintains additional state data to avoid double counting documents, for example, in the situation where a user is presented with a search result for document A, views document B, is presented with a search result for document A, and then views document C. Document C would be counted only one time for document A, even though it was viewed after document A was presented two times.

Figure 2B:
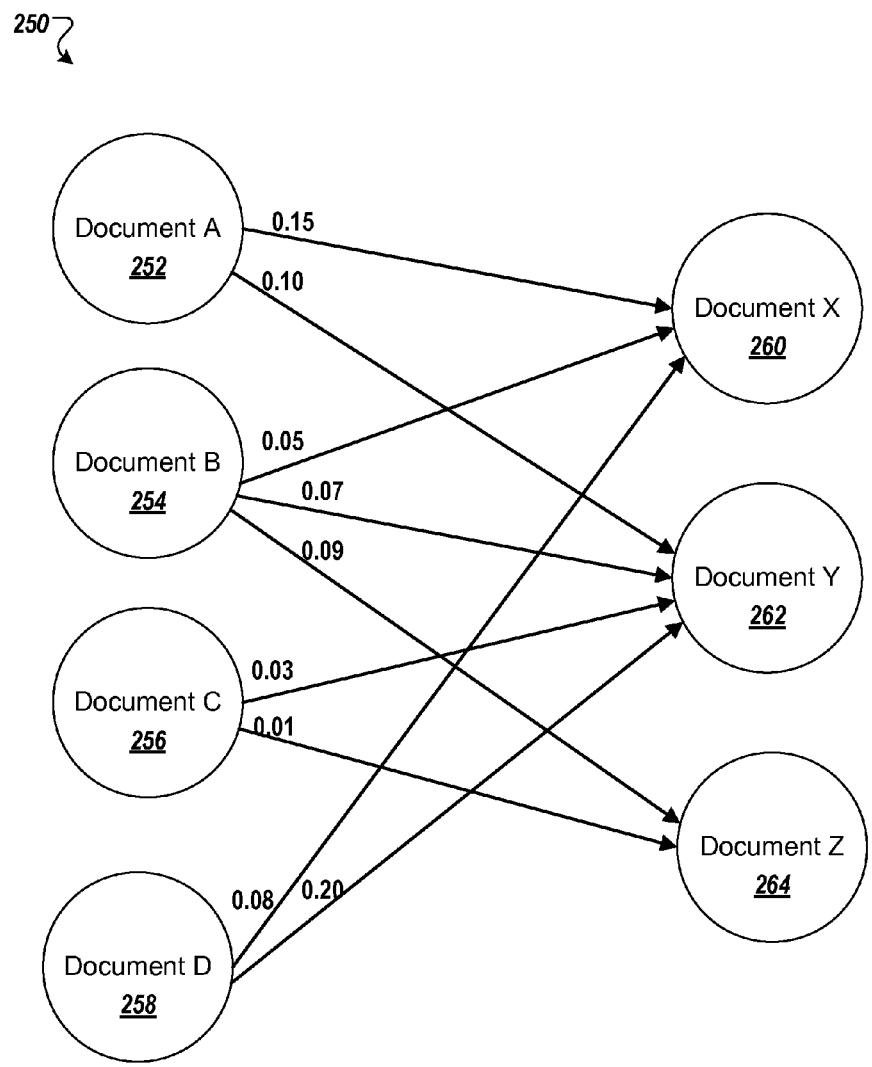
FIG. 2B is a graph that models relationships between documents generated from aggregate data from multiple users' interactions with the documents.

FIG. 2B is a graph that models relationships between documents generated from aggregate data from multiple users' interactions with the documents. The graph includes source nodes for documents A 252, B 254, C 256, and D 258 and sink nodes for documents X 260, Y 262, and Z 264. The directed edges from source nodes to sink nodes represent a relationship derived from aggregated user selection data (e.g., an aggregation of the edges described above with reference to FIG. 2A). The edges are weighted according to a score for each source document and each sink document. In some implementations, the scores represent the conditional probability that the sink document will be viewed given that the source document has been presented to the user in a results list, e.g. $P(g|i)$, where g is the sink document and i is the source document. The scores can be calculated in various ways, for example, by dividing the number of users who viewed the sink document after being presented with the source document by the number of users who viewed the source document, or summing the weights assigned to individual user selection (e.g., as described above with reference to FIG. 2A), and then dividing by the total number of times the source document was presented. The aggregated edge values can optionally be smoothed using standard statistical methods such as Laplace smoothing or Dirichlet smoothing. Other techniques for calculating the individual scores are also possible. For example, any score that indicates a strength of relationship, or similarity in preference, between documents can be used.

The weighted edges shown in FIG. 2B can be used, for example, by a set improver engine, to identify a set of related documents that are related to a set of initial documents. The set improver engine selects a group of documents, such as documents A, B, C, and D, and calculates the aggregate strength of relationships for each of the documents connected to other documents (e.g., documents X, Y, and Z), and then selects related documents based on the aggregate strength of relationship scores. In some implementations, the aggregate strength of relationship score represents the conditional probability that a sink document will be viewed by a user given that the set of source documents were presented to the user. The set improver engine can sum, average, or otherwise combine the strength of relationship scores between individual documents to calculate the aggregate strength of relationship scores. For example, the group score (0.28) for document X is calculated by summing the scores from document A to document X (0.15), document B to document X (0.05) and document D to document X (0.08). The group scores for document Y (0.40) and document Z (0.10) can be similarly calculated. The set improver engine then selects the related documents based on the scores, for example, by selecting a fixed number of documents with the highest scores, or by selecting all documents whose score exceeds a threshold. For example, if the threshold is 0.15, then documents X and Y will be selected as related documents for the group of documents A, B, C, and D, but document Z will not. The fixed number and the threshold can be determined, for example, empirically.

Figure 3:
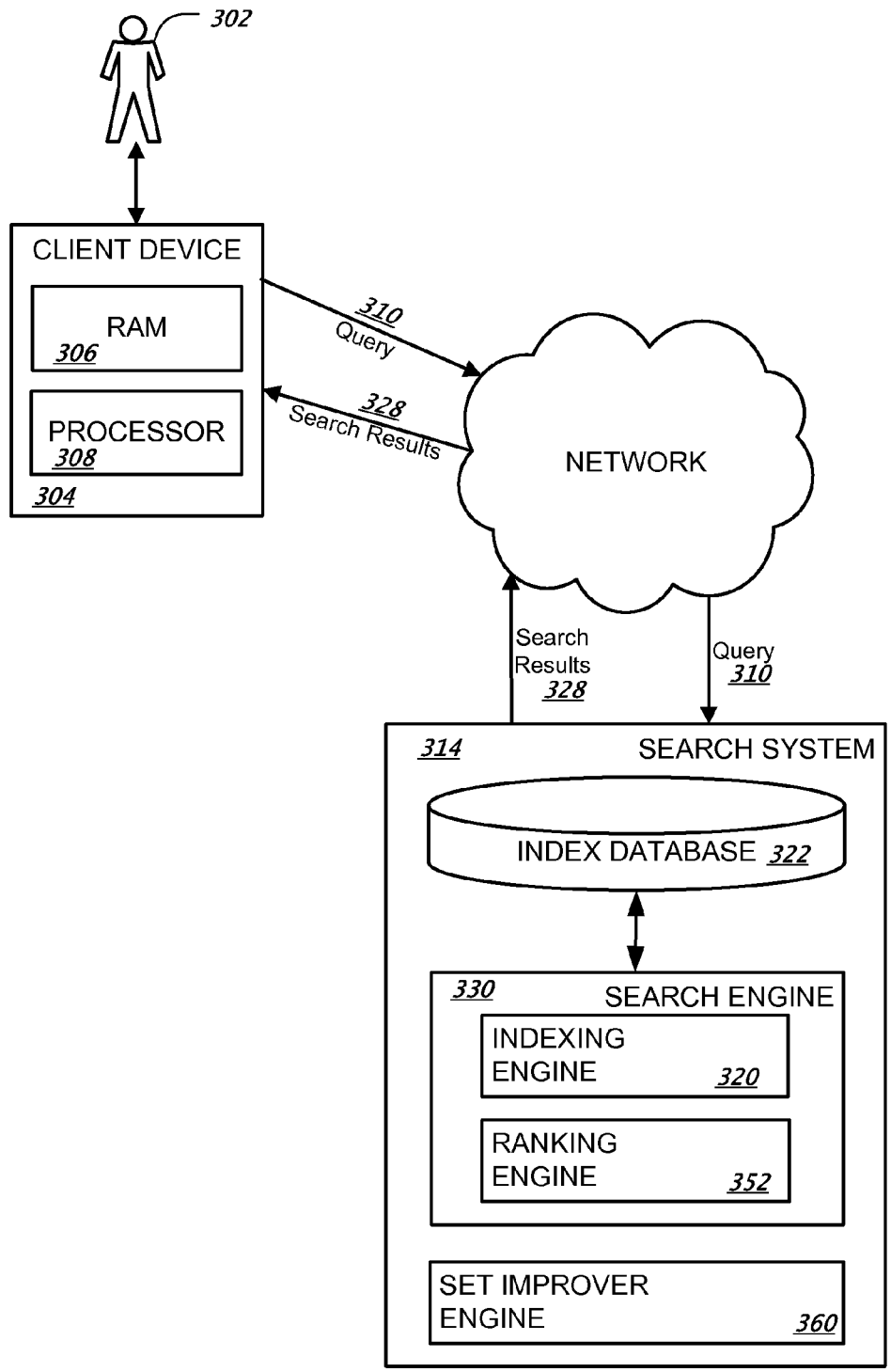
FIG. 3 illustrates an example search system for providing search results relevant to submitted queries.

FIG. 3 illustrates an example search system 314 for providing search results relevant to submitted queries as can be implemented in an internet, an intranet, or another client and server environment. The search system 314 is an example of an information retrieval system that can be used to generate the search results shown in FIG. 1, as well as to collect user selection data that the optional set improver engine 360 can use to generate related groups of documents from an initial group of documents.

A user 302 interacts with the search system 314 through a client device 304. For example, the client device 304 can be a computer (e.g., a personal computer, a mobile phone, etc.) coupled to the search system 314 through a wired or wireless local area network (LAN) or wide area network (WAN), e.g., the Internet. In some implementations, the search system 314 and the client device 304 are one machine. For example, a user can install a desktop search application on the client device 304. The client device 304 will generally include a random access memory (RAM) 306 and a processor 308.

A user 302 submits a query 310 to a search engine 330 within a search system 314. When the user 302 submits a query 310, the query 310 is transmitted through a network to the search system 314. The search system 314 can be implemented as, for example, computer programs running on one or more computers in one or more locations that are coupled to each other through a network. The search system 314 includes an index database 322 and a search engine 330. The search system 314 responds to the query 310 by generating search results 328, which are transmitted through the network to the client device 304 in a form that can be presented to the user 302 (e.g., as a search results web page to be displayed in a web browser running on the client device 304).

When the query 310 is received by the search engine 330, the search engine 330 identifies documents that match the query 310. The search engine 330 will generally include an indexing engine 320 that indexes web documents (e.g., web pages, images, multimedia content, or news articles on the Internet) found in a corpus (e.g., a collection or repository of content), an index database 322 that stores the index information, and a ranking engine 352 (or other software) to rank the documents that match the query 310. The indexing and ranking of the documents can be performed, for example, using conventional techniques. The search engine 330 transmits the search results 328 through the network to the client device 304 for presentation to the user 302.

In some implementations, the search system further includes a set improver engine 360 which generates related sets of search result documents from initial sets of documents. In some implementations, the search engine uses the sets generated by the set improver engine 360 to rank documents responsive to the user's query or to identify documents and queries to present to the user. The set improver engine 360 is described in more detail below with reference to FIG. 5.

Figure 4:
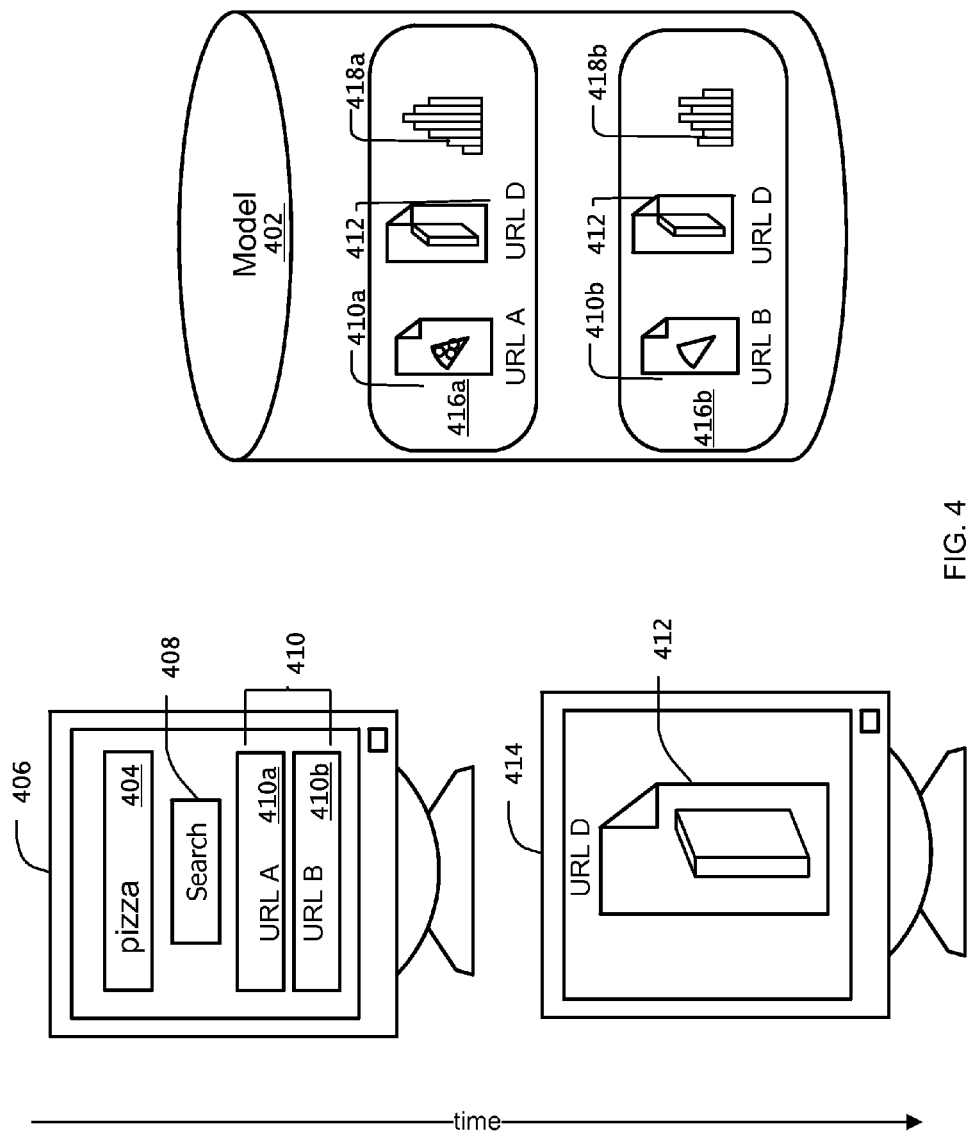
FIG. 4 illustrates an example of building a model database.

FIG. 4 illustrates an example of building a model database 402 for use by the set improver engine. The model database 402 is one or more databases that aggregate information indicative of user behavior for pairs of documents. In various implementations, information in the model database 402 is used as input to a process that generates a set of related documents from a set of initial documents. In various implementations, a document is referenced by a universal resource locator (URL) in the model database 402; however, other types of document references are possible. For instance, a document can be a web page on the World Wide Web referenced by a URL, or can be referenced by a globally unique user id (GUID) determined by an information retrieval system or the set improver engine.

As shown in FIG. 4, a user submits a query 404 such as, for instance, "pizza" to an information retrieval system, such as a search system 314, through a graphical user interface 406, or other user interface, as provided on a personal computer, a mobile telephone, or other device. The user interface can be, for example, the user interface 102 shown in FIG. 1, or another user interface. A query includes one or more terms. For example, a query can include the terms "bus," "river" and "hotel." In addition to dictionary words, terms can include special characters, numbers, mathematical expressions, Boolean expressions, slang terms, names, titles, images, sounds, videos, other suitable query terms, and combinations of these. Moreover, query terms can be in more than one language.

In response to the user selecting the search button 408 or issuing a search command, the search system 314 returns a ranking or result list 410 which is an ordered list of search results for documents that are responsive to the query 404. The result list 410 includes two search results, URL A 410*a* and URL B 410*b*. The result list 410 can contain the text of the URL itself, a short description of the information found within each document, a snapshot of the portion of the document which contains the query, other suitable information, or a combination of these. A user then continues to issue search queries or view documents, and, at a later period in time the user views the document corresponding to URL D 412 in user interface 414.

In various implementations, the model database 402 is built as users interact with search engines and view documents. The search system 314, or another system, tracks which search results are presented to a user and which documents a user views within a period of time after being presented with the search result. In some implementations, the period of time can be a fixed period of time, for example, 30 minutes, 2 hours, 10 hours, or 24 hours from when the search result is presented. In other implementations, the period of time is a fixed window of time (e.g., a 24 hour window that resets every 24 hours, regardless of when the search result is presented). In still other implementations, the period of time is a user session. In general, a user session is a period during which a user submits queries. A user session can be measured in a number of ways including, for example, by a specified period of time (for example, thirty minutes), by a specified number of queries (for example, fifteen queries), until a specified period of inactivity (for example, ten minutes without submitting a query), while a user is logged-in to a system, or while a user submits queries that relate to similar topics. In some implementations, the system also tracks whether the second document was viewed after being presented in response to a query that overlaps with the query the first document was presented in response to, and only relates the two documents in the model when the queries overlap. Overlapping queries are queries that have one or more words in common.

For example, in FIG. 4, the system tracks that the user is presented with search results for URL A 410*a* and URL B 410*b*, and then later views URL D 412. In some implementations, the system also uses a timer to measure how long the user views the document. The search system or another system creates records (e.g., 416*a* and 416*b*) in the model database 402 for each search result that is presented to a user, and each document a user views within a time period after being presented with the search result. Each record is at least a combination of the URL presented to the user (e.g., 410*a* and 410*b*), a document later viewed by the user (e.g., 412), and aggregate user data (e.g., 418*a* and 418*b*) for all users who view the document after the URL is presented to the user. The aggregate user data is a representation of user behavior and can be, for example, the individual strength of relationship scores described above with reference to FIG. 2B.

In some implementations, the search system or another system only includes entries for a pair of documents when a user clicks on the first document and then later views the second document (and not when the first document is merely presented as a search result). In other implementations, the search system or another system maintains multiple models, for example, one storing data for documents that were presented, and one storing data for documents that were clicked on.

In various implementations, model data is specific to a geographic location (e.g., a city, metropolitan region, state, country, or continent), specific to a language preference of users (e.g., as specified by the users in a profile or as determined from user search behavior, for example, the language of the queries issued by the user), or specific to a locale (e.g., specific to a geographic location or a set of geographic locations, and optionally a language preference). Other extensions of model data are possible. For example, in some implementations, the model can alternatively, or additionally, track what documents a user views after a user views a given document, independent of what, if any, search results are presented.

Figure 5:
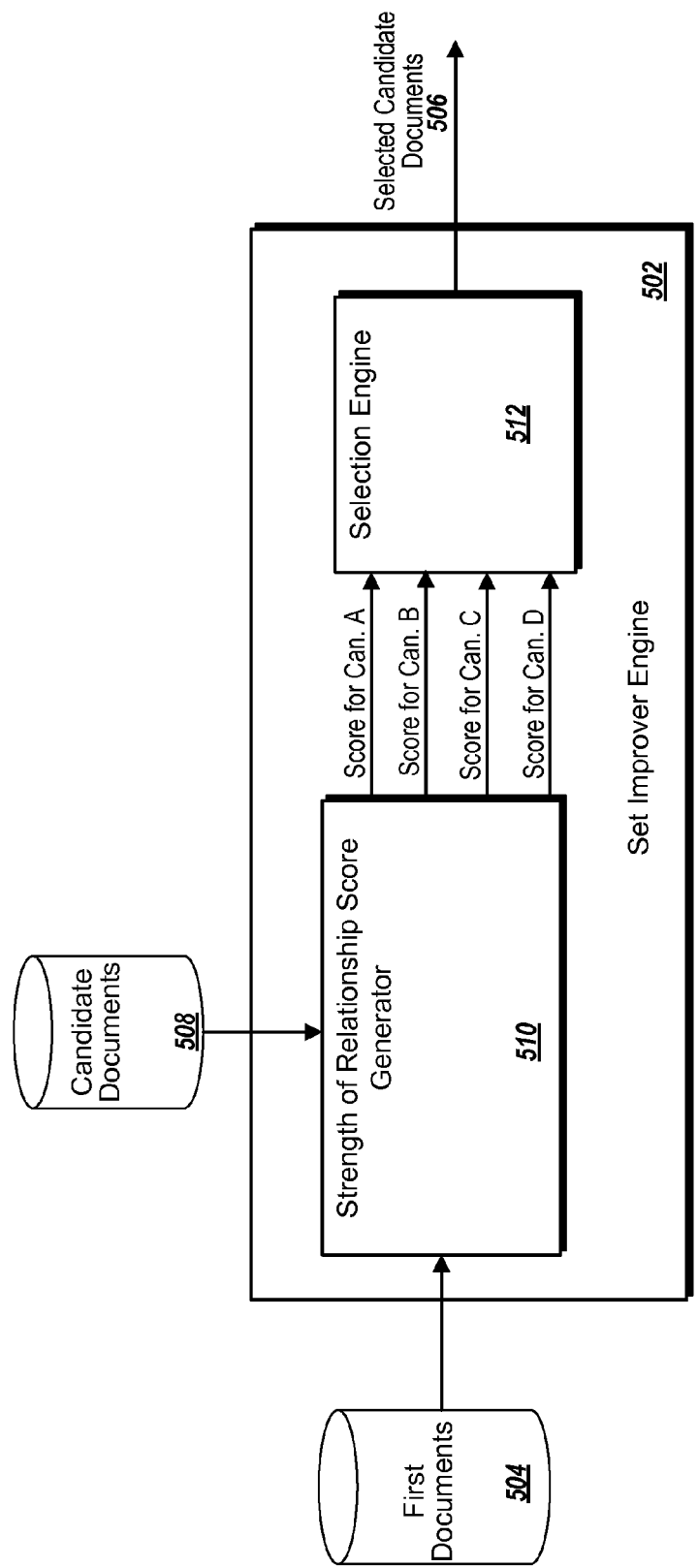
FIG. 5 illustrates an example set improver engine.

FIG. 5 illustrates an example set improver engine 502 (e.g., the set improver engine 360). In general, the set improver engine receives a set of first documents 504 and selects a set of documents 506 related to the first documents 504 from a set of candidate documents 508. The set of candidate documents 508 can be, for example, all documents included in the model 402 described in FIG. 4, or a subset of the documents. In some implementations, the candidate documents and the first documents are in the same corpus of web documents.

The set improver engine 502 includes a strength of relationship score generator 510 and a selection engine 512. The boxes shown in FIG. 5 logically represent executing software components or modules. These components can be combined or subdivided in ways other than those shown in FIG. 5 and can be distributed on two or more computing devices. The relationship score generator 510 generates relationship scores for candidate documents based on a strength of relationship between each candidate document and the first documents. The selection engine 512 selects candidate documents based on the scores, for example, by selecting a top number of highest scoring candidate documents or selecting all candidate documents whose score exceeds a threshold, for example, as described above with reference to FIG. 2B.

Figure 6:
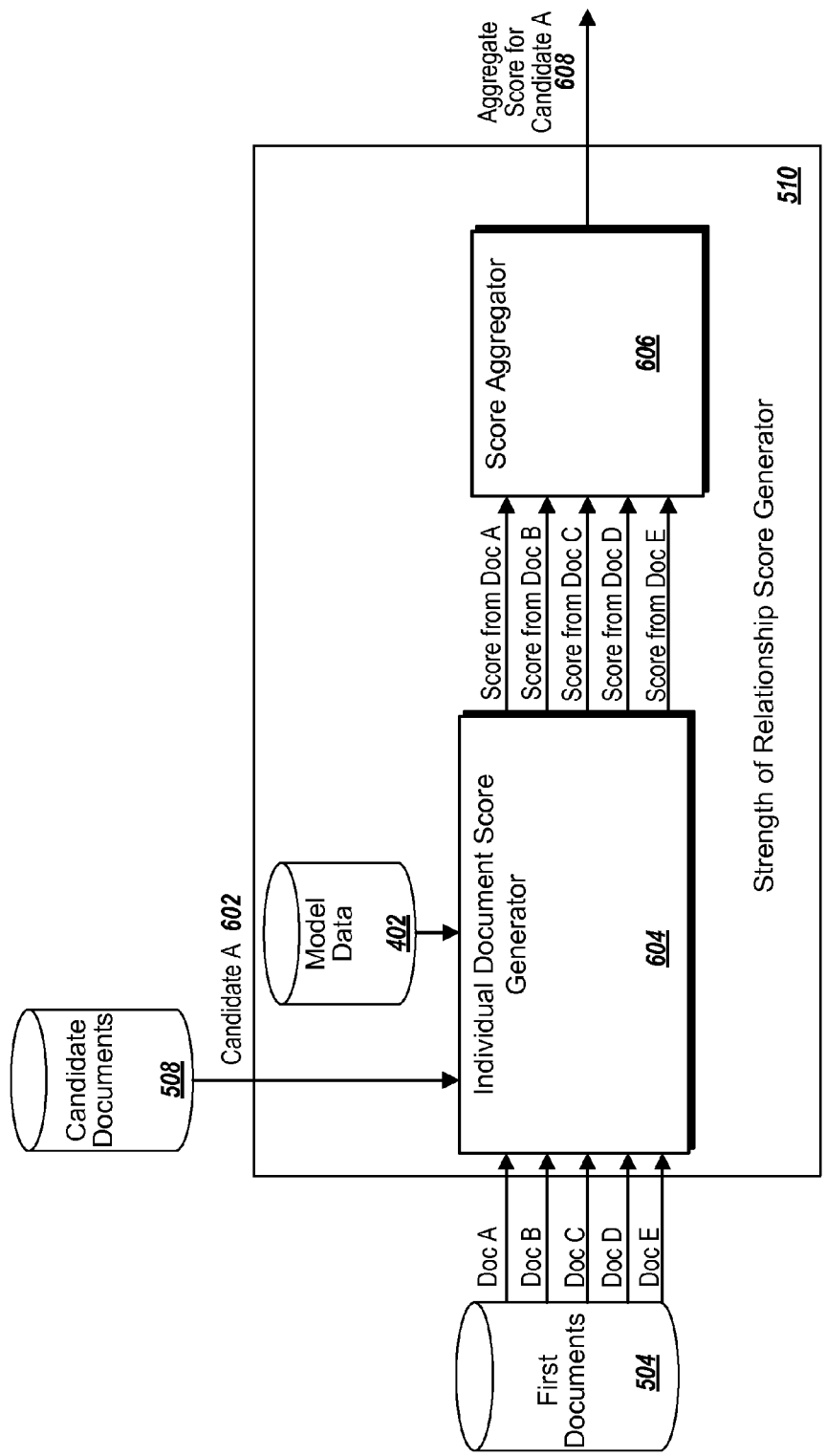
FIG. 6 illustrates an example strength of relationship score generator that generates a strength of relationship score for an individual document in a set of candidate documents based on a strength of relationship to documents in a first set of documents.

FIG. 6 illustrates an example strength of relationship score generator 510 that generates a strength of relationship score for an individual document (e.g., candidate A 602) in a set of candidate documents 508 based on a strength of relationship to documents in a first set of documents 504. The strength of relationship score generator 510 includes an individual document score generator 604 and a score aggregator 606. The boxes shown in FIG. 6 logically represent executing software components or modules. These components can be combined or subdivided in ways other than those shown in FIG. 6 and can be distributed on two or more computing devices.

The individual document score generator 604 generates a strength of relationship score between the candidate document 602 and each document in the first set of documents 504 from the model data 402. For example, in FIG. 4, the individual document score generator 604 generates five individual scores for candidate A 602, one corresponding to each document in the first set of documents (Doc A, Doc B, Doc C, Doc D and Doc E). In some implementations, the individual document score generator 604 retrieves the entry corresponding to the first document and the candidate document from the model 402 and uses the aggregate data stored in the model as the strength of relationship score for the candidate document and the first document. In other implementations, the individual document score generator modifies the aggregate data stored in the model, for example, by scaling it before using the data as the individual document score. In still other implementations, the individual document score generator combines aggregate data stored in multiple models. For example, if the model data 402 includes data from two models, one with entries corresponding to documents that were presented and documents that were viewed, and one corresponding to documents that were selected and documents that were viewed, the individual document score generator 604 can generate the score for the candidate document and the first document by combining the data stored in both models (e.g., adding or averaging the data). In some implementations, the individual score generator scales the data in one or more of the models relative to the data in the other models by a scoring factor. For example, the individual score generator can use a scoring factor (e.g., 10) to increase the weight given to data from the model where the first document was selected, rather than merely presented. In some implementations, where there is no data in the models for the two documents, the individual document score generator 604 assigns the documents a default score (e.g., 0). Other techniques of generating the score are also possible. For example, in some implementations, the individual document score generator 604 generates scores for multiple documents from the first set of documents and the candidate document. For example, the individual document score generator can generate a score for the candidate document given that both Document A and Document B were presented.

The score aggregator 606 then aggregates the individual scores for the candidate document and each document in the set of first documents 504 resulting in an aggregate score 608 for the candidate document 602. In the examples given below, the conditional probability $P(g|i)$ is used as the individual score for a candidate document g and a document i in the first set of documents. However, in some implementations other individual scores are used instead of the conditional probability, for example, the joint probability $P(g, i)$, or the scores described above with reference to FIG. 2.

The score aggregator can aggregate the scores in various ways. For example, in some implementations, the score aggregator 606 sums the individual scores, e.g.:

$$S(g) = \Sigma P(g|i)$$

where $S(g)$ is the aggregate score for candidate document g over all documents i in the set of first documents.

In other implementations, the score aggregator 606 calculates a weighted sum of the individual scores, e.g.:

$$S(g) = \Sigma w_i P(g|i)$$

where $w_i$ is the weight corresponding to document i. In some implementations, the weights can be positive or negative. A positive weight for a document i indicates that the document is representative of the documents the user is interested in (for example, because a user for whom the related set of documents is being generated has indicated that the user found that document relevant). A negative weight for a document i indicates that the document is not representative of the documents the user is interested in (for example, because a user for whom the related set of documents is being generated has indicated (implicitly or explicitly) that the user did not find the document relevant).

In some further implementations, the score aggregator scales the score, for example, by taking the logarithm of the sum of the individual scores, e.g.:

$$S(g) = \ln(\Sigma_i w_i P(g|i))$$

In some implementations, the score aggregator normalizes the score for a candidate document by an overall popularity of the document, e.g., how often a population of users views the document compared to how often the population views other documents. For example, the score aggregator can divide by the score by the overall popularity of the candidate document (optionally weighted by the weights of the first documents), e.g.:

$$S(g) = \frac{\sum_i w_i P(g \mid i)}{P(g) \sum_i |w_i|}$$

or, if the logarithm is used, $$S(g) = \ln\left(\frac{\sum_i w_i P(g \mid i)}{P(g) \sum_i |w_i|}\right),$$

where P(g) is the overall popularity of the candidate document g. P(g) can be derived from user selection data, for example, by dividing the number of times that users viewed the document g by the number of times users viewed any document.

Alternatively, the score aggregator can normalize the score by summing logarithms of the individual probabilities and then subtracting a logarithm corresponding to the popularity of the candidate document, e.g.:

$$S(g) = (\Sigma_i w_i \ln(P(g|i))) - (\ln(P(g))\Sigma_i |w_i|)$$

Other techniques of aggregation are also possible, for example, averaging the individual scores instead of summing them.

Figure 7:
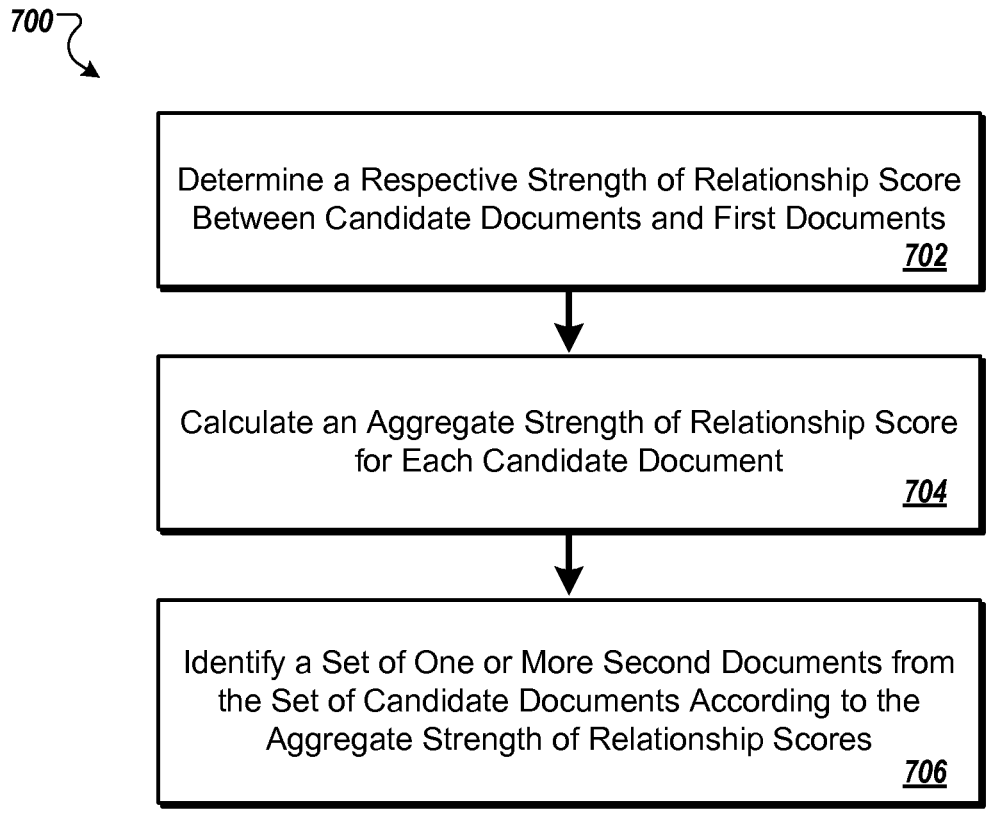
FIG. 7 illustrates an example technique for generating a set of related documents from a set of initial documents.

FIG. 7 illustrates an example technique 700 for generating a set of related documents from a set of initial documents. For convenience, the example technique 700 will be described in reference to a system that performs the technique 700. The system can be, for example, the set improver engine 502.

The system determines a respective strength of relationship score between candidate documents and first documents (step 702). The system determines each strength of relationship score from aggregate user selection data for a population of users. The user selection data indicates, for each user, whether the user viewed the candidate document during a window of time after the first document was presented to the user on a search results web page in response to a query. For example, in some implementations, the user selection data is the data stored in the model 402 illustrated in FIG. 4. The system determines the strength of relationship scores, for example as described above with reference to FIG. 6. The first documents can be identified in various ways, for example, from a user search history, from a user's browsing history, or from a user's bookmarked web pages.

In some implementations, the system identifies related documents that are tailored to a particular natural language, geographic location, or locale. For example, in some implementations, the system maintains separate models for different languages, locations, and locales, and uses the appropriate data to generate the related documents. In other implementations, the system does not maintain separate models but instead tracks what fraction of users viewing a candidate document are associated with the language, location, or locale, and then scales the model data according to the fractions. For example, if 90% of the time, people who view a candidate document are associated with the language French, and 5% of the time, people who view the candidate document are associated with the language English, then if the system is considering the candidate document for a user associated with the language English, then the scores for the candidate document would be scaled by 0.05.

The system calculates an aggregate strength of relationship score for each candidate document (step 704). The system calculates the aggregate strength of relationship score from the individual strength of relationship scores for the candidate document, for example, as described above with reference to FIG. 6.

The system identifies a set of one or more second documents from the set of candidate documents according to the aggregate strength of relationship scores (step 706), for example, as described above with reference to FIG. 5.

The identified set of second documents can be used in various applications, some exemplary examples of which are described below.

Figure 8:
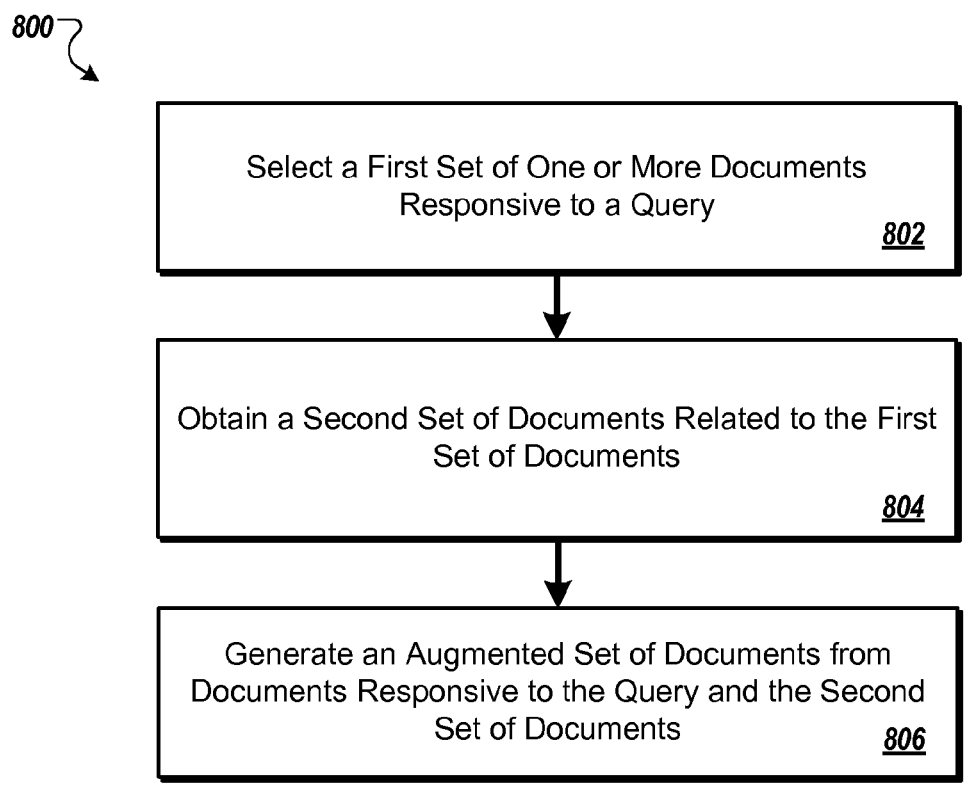
FIG. 8 illustrates an example technique for augmenting a set of search results responsive to a query with documents related to the query.

FIG. 8 illustrates an example technique 800 for augmenting a set of search results responsive to a query with documents related to the query. For convenience, the example technique 800 will be described in reference to a system that performs the technique 800. The system can be, for example, a search system such as the search system 314.

The system selects a first set of one or more documents responsive to a search query (step 802). The query can be received from a user, or can be identified by the system, for example, by parsing past records of what queries users have submitted. The system identifies the set of documents responsive to the query, for example, as described above with reference to FIG. 3. In some implementations, the first set of documents is all documents responsive to the query. In other implementations, the first set of documents is a subset of the documents responsive to the query, for example, a top number of documents according to the rank assigned by the search system. The number can be determined, for example, empirically.

The system obtains a second set of documents related to the first set of documents (step 804), for example, as described above with reference to FIG. 7. In some implementations, the system weights the individual scores for candidate documents and each first document by a weight that is inversely proportional to the rank of the first document in the first set of documents (e.g., the first document has the highest weight, the last document has the lowest weight).

The system generates an augmented set of documents from the documents responsive to the query and the second set of documents (step 806). In various implementations, the system generates the augmented set of documents by inserting one or more of the documents from the second set of documents into the set of documents responsive to the query. In some implementations, the set of documents responsive to the query is ordered according to an order, and the system determines locations in the order at which to insert each of the second set of documents. The system can determine the locations in various ways, for example, by randomly selecting locations, or selecting locations based on the aggregated strength of relationship score for the document (e.g., by selecting higher locations when the aggregated strength of relationship score is higher). In some implementations, the system uses a framework that tests different locations for the second set of documents over time.

In some implementations, the system generates the augmented set of documents in response to receiving the search query from the user, and then presents the augmented set of documents in response to the query, for example, by transmitting the search results to a user computer for presentation to the user, as described above with reference to FIG. 3. In other implementations, the system generates the augmented set of documents in advance and stores them as responsive documents to the query. When a user later submits the query, the system presents the augmented set of documents as the search result for the query.

Figure 9:
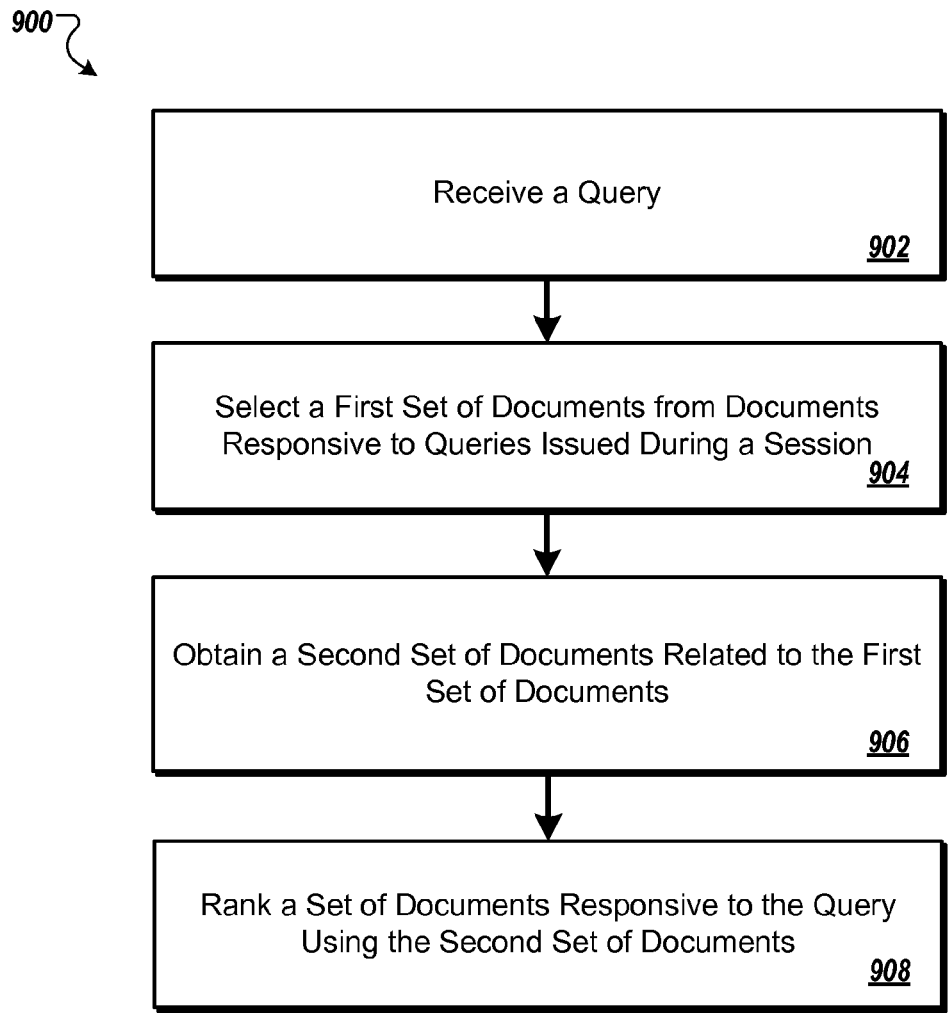
FIG. 9 illustrates an example technique for session based ranking of search results.

FIG. 9 illustrates an example technique 900 for session based ranking of search results. For convenience, the example technique 900 will be described in reference to a system that performs the technique 900. The system can be, for example, a search system such as the search system 314.

The system receives a query (step 902), for example, as described above with reference to FIG. 8.

The system selects a first set of documents from documents responsive to queries issued during a session (step 904). For example, during a user search session the system can track what queries a user submits (and optionally, what documents are responsive to those queries). The system then selects a number of the queries and a number of documents responsive to each query. The system can use various techniques to select the documents. In some implementations, the system selects all documents presented in response to a given number of past queries. The number of queries can be fixed (e.g., the past five queries) or can be all queries occurring within a set time window from when the query is issued (e.g., all queries issued in the last fifteen minutes). In other implementations, the system selects all documents responsive to the query received in step 902 (or alternatively, the last query issued before that) and all documents that a user selected after they were presented in response to a given number of past queries (e.g., the past five queries). In some implementations, the system only includes documents presented in response to queries that have some query overlap with the query.

The system obtains a second set of documents related to the first set of documents (step 906), for example, as described above with reference to FIG. 7. In some implementations, the system assigns higher weights to individual scores for the candidate documents and documents in the first set of documents that are responsive to the query received in step 902.

The system ranks a set of documents responsive to the query using the second set of documents (step 908). The set of documents responsive to the query can be generated, for example, as described above with reference to FIG. 3. The system ranks the set of documents responsive to the query by increasing the ranking of documents that are also in the second set of documents. For example, if each document responsive to the query has a score corresponding to its rank, the system can modify the score of the documents included in the second set of documents (e.g., by multiplying the score by a scaling factor or adding a constant to the score). The factor and/or constant can be determined, for example, empirically. The system can then rank the documents according to the modified scores.

Figure 10:
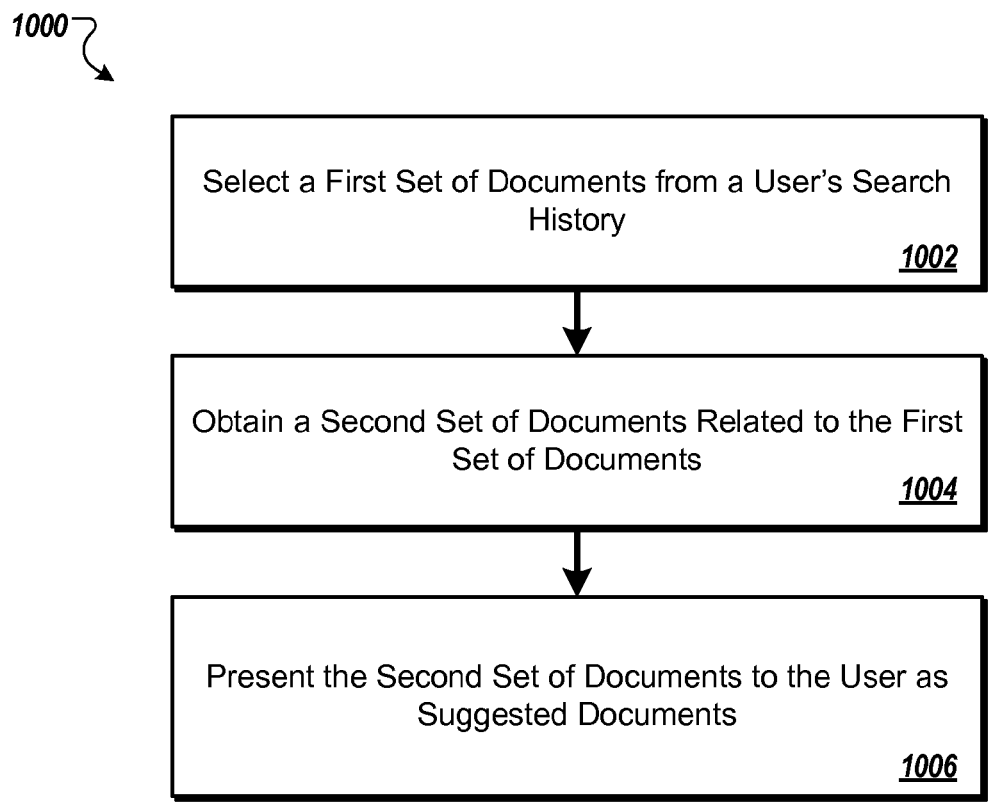
FIG. 10 illustrates an example technique for identifying a set of documents related to documents in a user's search history, and then recommending the set of related documents.

FIG. 10 illustrates an example technique 1000 for identifying a set of documents related to documents in a user's history (e.g., a user's search history, a history of what documents a user has viewed, or a set of documents bookmarked by a user), and then recommending the set of related documents. For convenience, the example technique 1000 will be described in reference to a system that performs the technique 1000. The system can be, for example, a search system such as the search system 314, or a toolbar running in a user's web browser.

The system selects a first set of documents from a user's history (step 1002). In some implementations, the history is a search history that is maintained, for example, by the search system 314. The search history tracks which queries a user submits and which documents a user views during a search session. The search history can correspond to a current user session or a given period of time (e.g., the last fifteen minutes, the last week, or the last few months).

The system can select the first set of documents in various ways. In some implementations, the system selects documents that a user has viewed in the current session as the first set of documents (e.g., all of the documents viewed during the session, a number of the documents the user has viewed recently, such as the last five documents the user viewed, or all documents the user viewed in response to the last query the user submitted). In other implementations, the system selects documents that are responsive to one or more queries the user submitted during the current session. Other techniques for selecting the first set of documents are also possible, for example, in some implementations, the system selects the first set of documents from a set of bookmarked documents that the user has saved for future reference, or from a set of documents.

The system obtains a second set of documents related to the first set of documents (step 1004), for example, as described above with reference to FIG. 7. In some implementations, the system weights the individual scores for the candidate documents and documents in the first set of documents according to when the documents in the first set of documents were viewed (e.g., by using weights that are determined according to a function of the time since the document was viewed, for example, a linear function whose result is higher when the period of time is shorter). In some implementations, the system weights the individual scores for the candidate documents and documents in the first set of documents based on the length of time that the documents in the first set of documents were viewed (e.g., weights the scores by weights determined according to a function of the time the documents were viewed, such as a linear function whose output is higher when the period of time is longer).

The system presents the second set of documents to the user as suggested documents (step 1006). In some implementations, the system presents the first set of documents by presenting them in (or transmitting them to the user's computer for presentation in), for example, a search engine interface or a toolbar window. In other implementations, the system presents an "I'm Feeling Lucky" button to the user. When the user clicks on the button, the system causes the user's web browser to load the first document in the set of second documents.

Figure 11A:
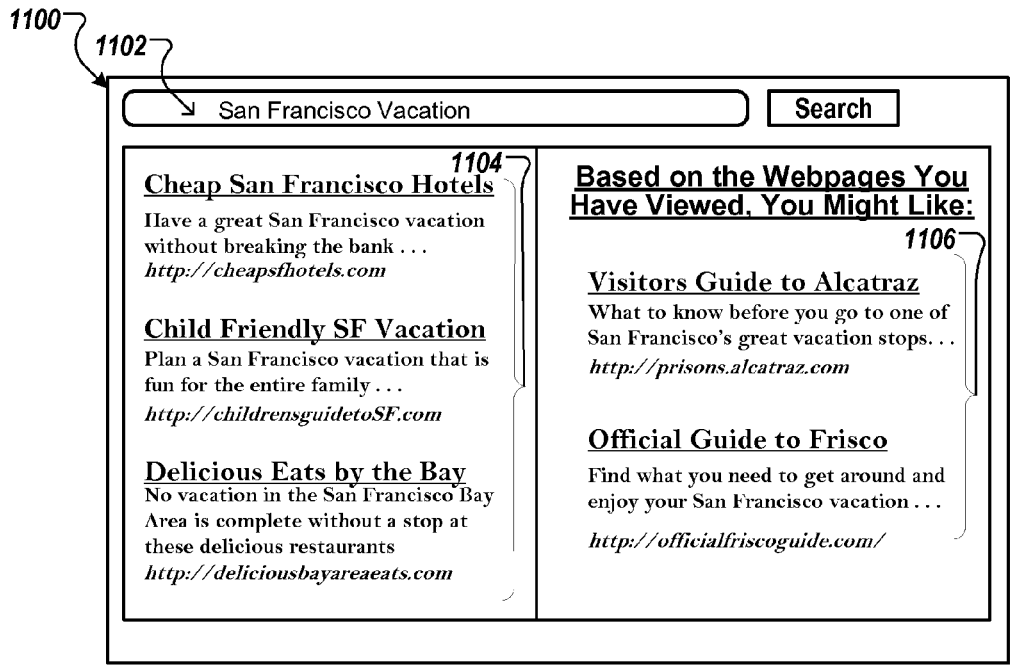
FIGS. 11A and 11B illustrate example graphical user interfaces for presenting recommended documents to users.
Figure 11B:
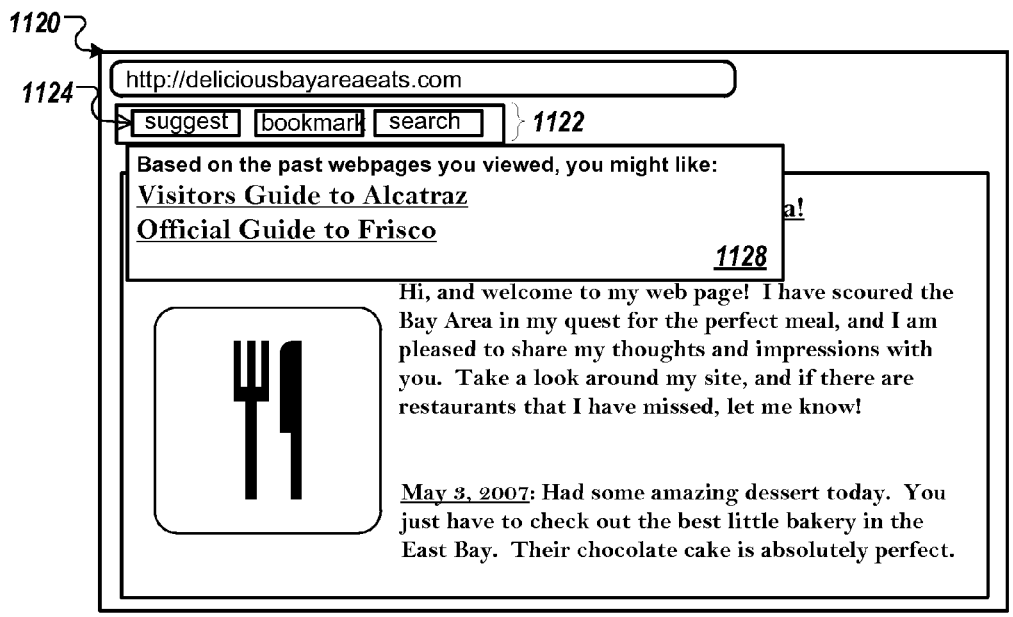

FIGS. 11A and 11B illustrate example user interfaces for presenting recommended documents to users. In FIG. 11A, a search engine interface 1100 is shown. When a user enters a query 1102 for "San Francisco Vacation," search results 1104 responsive to the query are presented. The interface also includes recommended documents 1106. In FIG. 11B, a user interface 1120 containing a toolbar 1122 is shown. When the user clicks on the suggest button 1124 in the toolbar interface, the user is presented with recommended documents 1128.

Figure 11C:
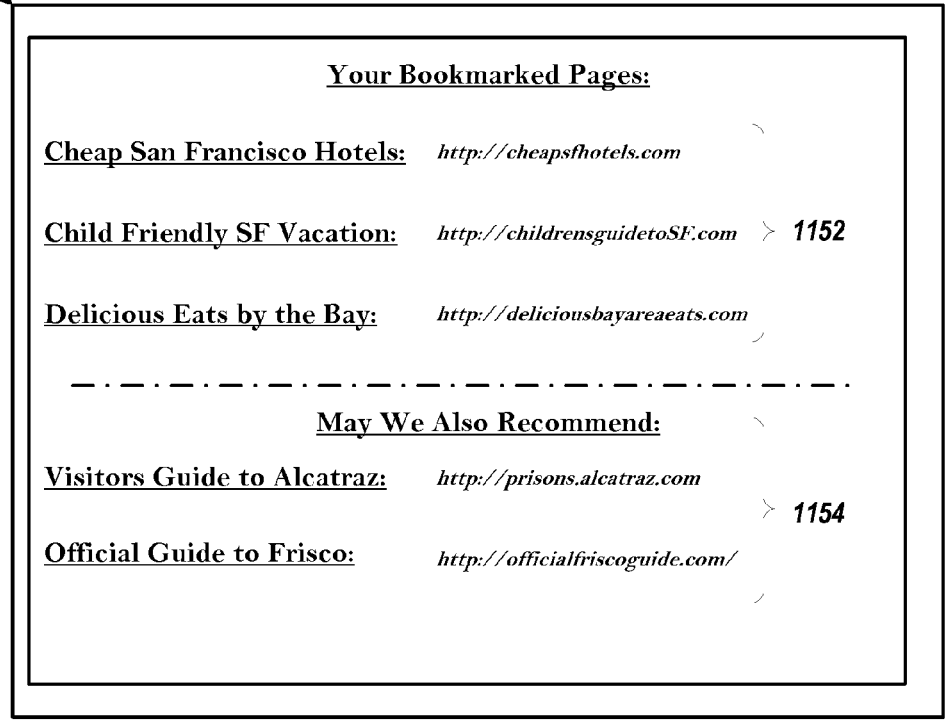
FIG. 11C illustrates an example user interface for presenting recommended documents based on a user's bookmarked pages.

FIG. 11C illustrates an example user interface 1150 for presenting recommended documents based on a user's bookmarked pages. The user interface 1150 includes the user's bookmarked pages 1152, and also includes recommended documents 1154 generated from the bookmarked web pages.

Figure 12:
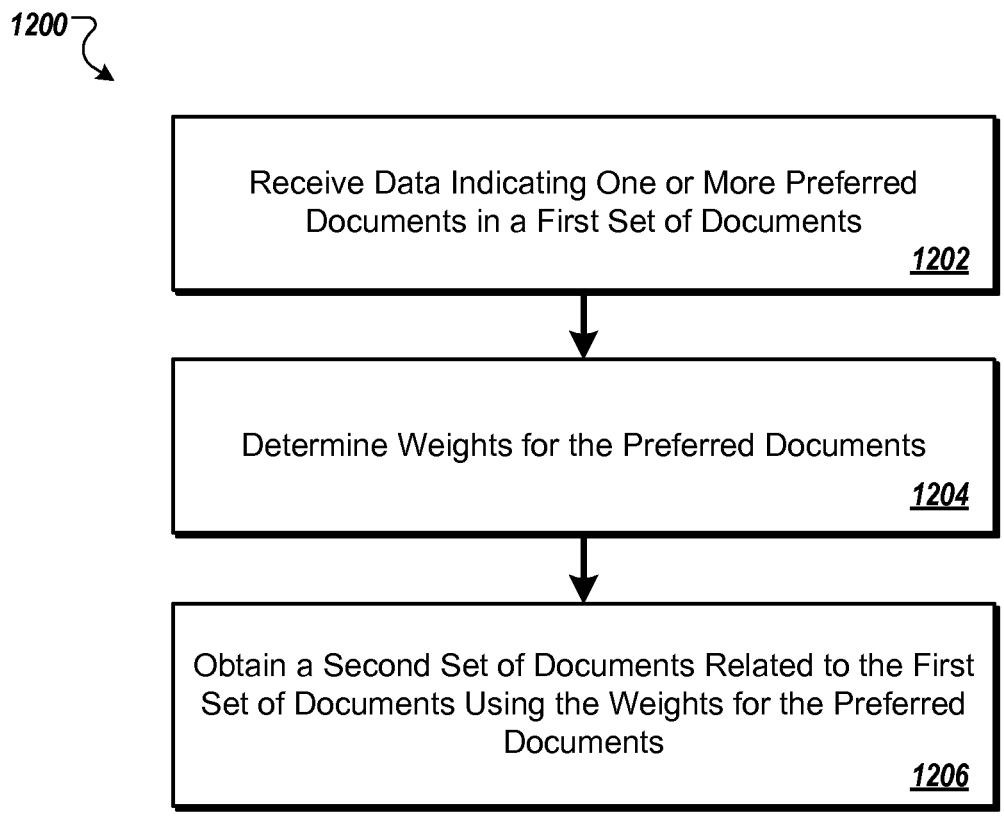
FIG. 12 illustrates an example technique for generating a set of documents related to a set of documents, based on user data indicating one or more preferred documents in the set of documents.

FIG. 12 illustrates an example technique 1200 for generating a set of documents related to a set of documents, based on user data indicating one or more preferred documents in the set of documents. For convenience, the example technique 1200 will be described in reference to a system that performs the technique 1200. The system can be, for example, a search system such as the search system 314, or a toolbar running in a user's web browser.

The system receives data indicating one or more preferred documents in a first set of documents (step 1202). The first set of documents can be, for example, a set of documents responsive to a search query, or the first set of documents described above with reference to FIG. 11. The data indicating one or more preferred documents can be search history data, for example, how long a user viewed each of the documents (or whether the user viewed the documents), or it can be a user rating indicating, for example, that a document is preferred or that the user has given the document a certain score on a scoring scale (e.g., 3 out of 5 stars). The system then determines weights for the preferred documents (step 1204). In some implementations, the weights are derived from the time the user viewed the document or the rating the user gave the document (e.g., the weights can be the time, the rating, or a factor derived from the time or the rating). In other implementations, the weights are fixed, e.g., each document that is preferred (e.g., because a user said it was preferred, viewed it for a threshold period of time, or gave it a rating above a threshold) is given the same weight.

The system then obtains a second set of documents related to the first set of documents using the weight for the preferred documents (step 1206). For example, the system can obtain the set of documents as described above with reference to FIG. 7, where the strength of relationship scores between individual documents in the first set of documents and candidate documents are weighted during aggregation by the weights determined by the system.

In some implementations, the system then presents the related documents to the user, for example, as described above with reference to FIG. 11.

In some implementations, the system also receives data indicating that a user dislikes a document, determines weights for the disliked documents (e.g., negative weights, or weights less than 1), and obtains the second set of documents based on the weights for the preferred and disliked documents.

Figure 13:
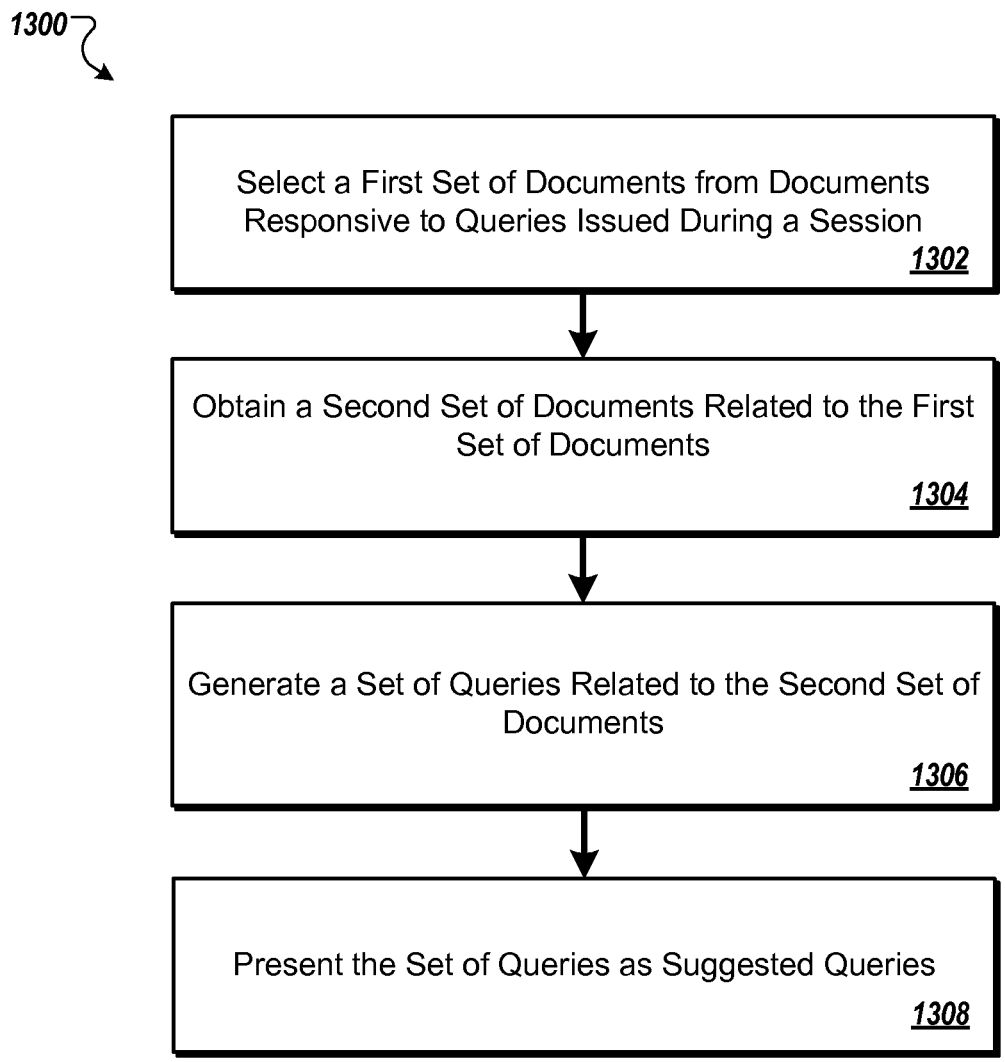
FIG. 13 illustrates an example technique for generating a set of queries related to a set of documents, and then presenting the queries to a user as a set of suggested queries.

FIG. 13 illustrates an example technique 1300 for generating a set of queries related to a set of documents, and then presenting the queries to a user as a set of suggested queries. For convenience, the example technique 1300 will be described in reference to a system that performs the technique 1300. The system can be, for example, a search system such as the search system 314.

The system selects a first set of documents from documents responsive to queries issued during a session (step 1302), for example, as described above with reference to FIG. 9.

The system obtains a second set of documents related to the first set of documents, for example, as described above with reference to FIG. 7.

The system generates a set of queries related to the second set of documents (step 1306). The system generates the set of related queries by mapping the second set of documents to a set of related queries, and then selecting the queries most often associated with the documents. For example, in some implementations, the system generates a list of queries for each document, where the document is responsive to the queries, counts the number of times each query is associated with a document, and then selects a number of the queries with the highest count (or all queries whose count exceeds a threshold). The number and the threshold can be determined, for example, empirically. In other implementations, the system uses a document-query database to identify queries that are related to documents from user preference data, where the user preference data indicates how often a user selects a document after viewing a query. The user preference data can be stored, for example, in a database that stores a tuple for each document and query pair. Each tuple identifies the document, the query, and includes aggregated click data for all users that select the document in response to the query. The aggregated click data can be, for example, a tuple score. In general, the tuple score estimates how responsive users found a given document to be as a search result for a given query. For example, a tuple score can be an average of the weighted long clicks for a given document and query pair, a sum of the weighted clicks for a given document and query pair, or a click fraction for a given document and query pair. Various weights are also possible, for example, the clicks can be weighted by the length of the clicks (e.g., how long the user viewed the document), by how quickly a user clicked on a result, and whether a user clicked on a result first, second, third, etc. Various types of click fractions are possible. For example, in some implementations, the click fraction is calculated by dividing the number of clicks (or the number of weighted clicks) by the number of impressions (e.g., the number of times the document was presented as a search result for the query). In other implementations, the click fraction is calculated by dividing the sum of the weighted clicks by the total number of clicks. In still other implementations, the click fraction is the sum of weighted clicks for the document presented in response to the query divided by sum of weighted clicks for all documents presented in response to the query. Other click fractions are also possible. In various implementations, the data is specific to a geographic location (e.g., a city, metropolitan region, state, country, or continent), specific to a language preference of users (e.g., as specified by the users in a profile or as determined from user search behavior, for example, the language of the queries issued by the user), or specific to a locale (e.g., specific to a geographic location or a set of geographic locations, and optionally a language preference). The user preference data can be generated, for example, by a search engine or a user's browser.

In some implementations, rather than choosing the queries that overlap with the most documents, the system chooses a set of queries that covers the second set of documents (or a subset corresponding to the top scoring documents in the second set of documents) with minimal overlap. For example, if the top set of documents includes documents 1-9, query A is associated with documents 1, 2, 5, and 6, query B is associated with documents 3, 4, 7, 8, and 9, and query C is associated with documents 1, 2, 7, 8, and 9, the system would select query A and query B and ignore query C, because queries A and B have no overlap in documents, and every document associated with query B is also associated with either query A or query B. Standard techniques can be used to select the queries such that they have minimum overlap in documents.

The system presents the set of queries as suggested queries (step 1308). The system presents the first set of documents by presenting them in (or transmitting them to the user's computer for presentation in), for example, a search engine interface or a toolbar window.

Figure 14A:
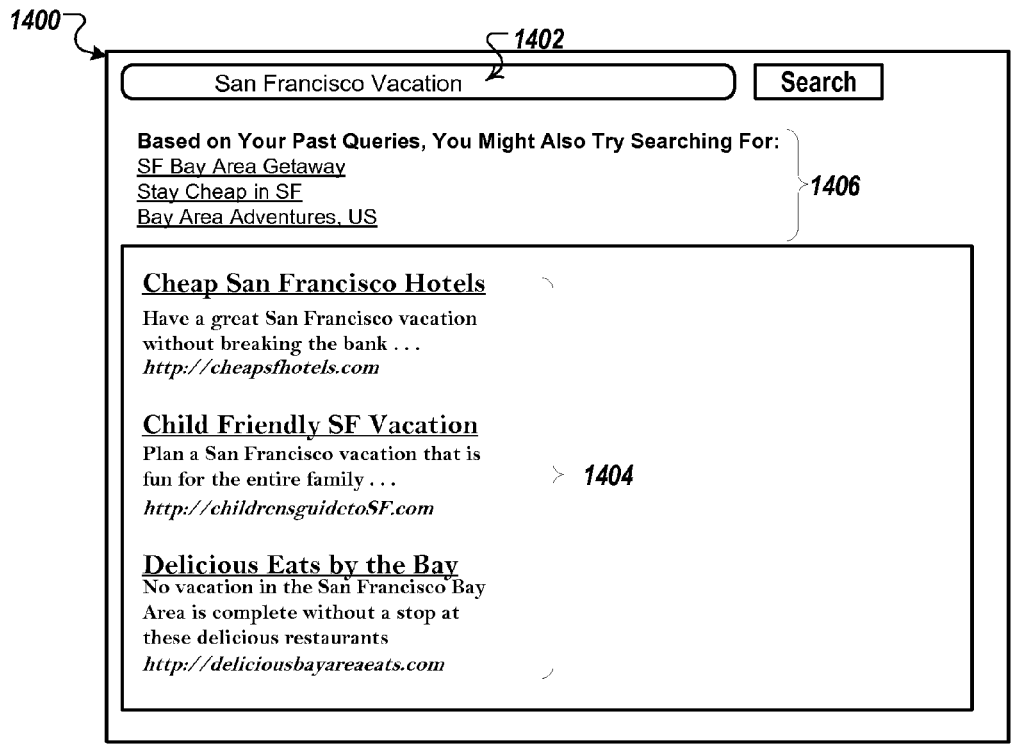
FIGS. 14A and 14B illustrate example graphical user interfaces for presenting recommended queries to users.
Figure 14B:
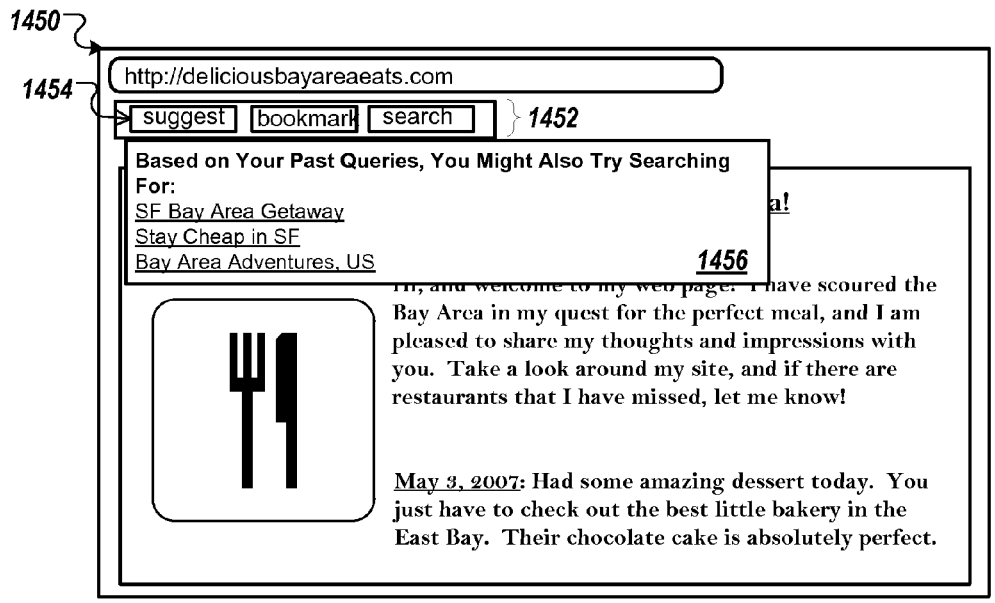

FIGS. 14A and 14B illustrate example user interfaces for presenting recommended queries to users. In FIG. 14A, a search engine interface 1400 is shown. When a user enters a query 1402 for "San Francisco Vacation," search results 1404 responsive to the query are presented. The user interface 1400 also presents recommended queries 1406. When a user clicks on one of the recommended queries 1406, a new search is performed for that query. In FIG. 14B, a user interface 1450 containing a toolbar 1452 is shown. When the user clicks on the suggest button 1454 in the toolbar interface, a toolbar window appears that presents recommended queries 1456 to the user. If the user clicks on one of the recommended queries 1456, a new search is performed for that query.

Figure 15:
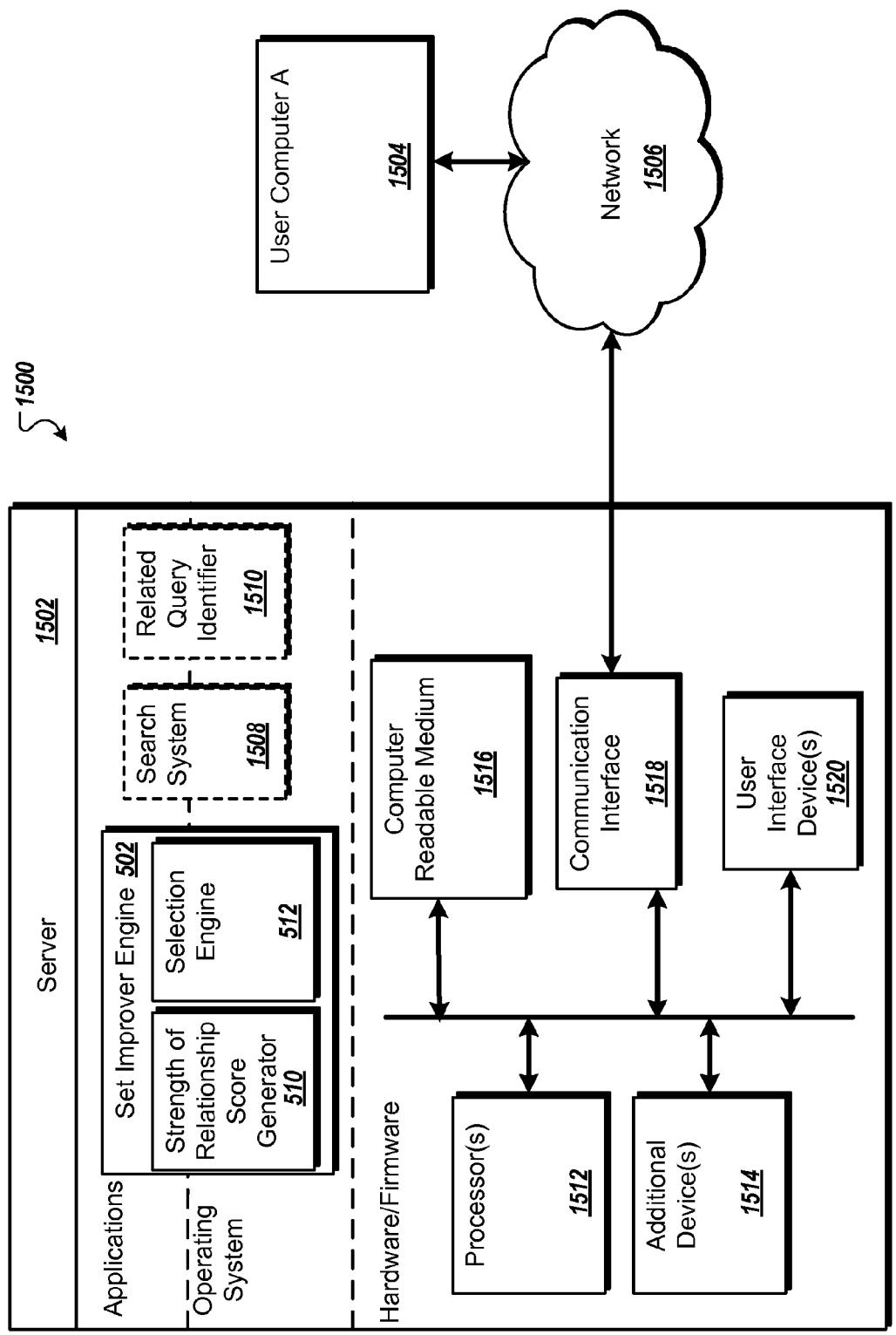
FIG. 15 illustrates an example architecture of a system.

FIG. 15 illustrates an example architecture of a system 1500. The system generally consists of a server 1502 and one or more user computers such as user computer A 1504. The server 1502 and user computers are connected through a network 1506. The server 1502 consists of one or more data processing apparatus. While only one data processing apparatus is shown in FIG. 15, multiple data processing apparatus can be used. The server includes various modules, e.g. executable software programs, including a set improver engine 502, an optional search system 1508, and an optional related query identifier 1510. Each module runs as part of the operating system on the server, runs as an application on the server, or runs as part of the operating system and part of an application on the server.

The set improver engine 502 includes a strength of relationship score generator 510 and a selection engine 512, and generates a set of related documents from a set of initial documents, for example, as described above with reference to FIGS. 5-7. The optional search system 1508 generates search results responsive to user queries and gathers data indicating what results are presented to a user and what results the user selects, for example, as described above with reference to FIGS. 3 and 4. The optional search system 1508 may also include modules for augmenting a set of search results responsive to a query with additional documents related to the search results, for example, for example, as described above with reference to FIG. 8, or for performing session-based scoring, for example, as described above with reference to FIG. 9. The related query identifier 1510 identifies queries related to documents viewed by a user or presented to a user, for example, as described above with reference to FIG. 13.

The server 1502 can also have hardware or firmware devices including one or more processors 1512, one or more additional devices 1514, computer readable medium 1516, a communication interface 1518, and one or more user interface devices 1520. Each processor 1512 is capable of processing instructions for execution within the server 1502. In some implementations, the processor 1512 is a single or multi-threaded microprocessor, for example. Each processor 1512 is capable of processing instructions stored on the computer readable medium 1516 or on another storage device. The server 1502 uses its communication interface 1518 to communicate with one or more computers, for example, over a network. Examples of user interface devices 1520 include a display, a camera, a speaker, a microphone, a tactile feedback device, a keyboard, and a mouse.

The server 1502 can store instructions that implement operations associated with the modules described above, for example, on the computer readable medium 1516 or one or more additional devices 1514, for example, one or more of a floppy disk device, a hard disk device, an optical disk device, or a tape device. In some implementations, the server 1502 also stores additional data, for example, model data, a document-query database, or other data, on the computer readable medium 1516 or one or more additional devices 1514.

User computers such as user computer A 1504 are connected to the server 1502 through the network 1506. Users submit search queries to the server 1502 and select search results received from the server 1502 using user computers such as user computer A 1504, for example, using a web-browser running on the computer. Users may also view other documents using the web-browser. Users can also use user computers such as user computer A 1504 to view recommendations from the server 1502, for example, recommendations for related documents or queries.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

As another example, the strength of relationship score between each candidate document and each first document described above, for example, with reference to FIGS. 6 and 7 can be based on other measures of relatedness between documents besides whether the user viewed the candidate document after the first document was presented as a search result. For example, the strength of relationship can be based on how many users that viewed the first document later viewed the candidate document. In some implementations, the score for the first document and the candidate document is weighted by one or both of the number of documents users viewed between the two documents, or the amount of time that passed between the time the first document was viewed by a user and the second document was viewed by that user.

What is claimed is:

1. A computer-implemented method for identifying one or more second documents related to one or more documents of a set of first documents, the method comprising:
aggregating user selection data for multiple users, the first documents and a group of candidate documents being in a corpus of web documents, the user selection data indicating, for each of the multiple users, whether the user viewed one of the candidate documents during a window of time after a search result corresponding to one of the first documents was presented to the user on a search results web page in response to a query;
determining, using the aggregated user selection data, a respective strength of relationship score between each candidate document in the group of candidate documents and each first document in the set of first documents, each respective strength of relationship score being determined based on whether each user of the multiple users viewed the candidate document during the window of time after a search result corresponding to the first document was presented to the user on a search results web page in response to a query;
calculating an aggregate strength of relationship score for each candidate document from the respective strength of relationship scores for the candidate document; and
selecting the one or more second documents from the candidate documents according to the aggregate strength of relationship scores for the candidate documents.

2. The method of claim 1 wherein the user selection data further indicates whether each of the multiple users viewed the candidate document for a threshold period of time.

3. The method of claim 1 wherein aggregating user selection data further comprises scaling the user selection data for one of the multiple users by a scoring factor when the one of the multiple users views the candidate document during the window of time after the first document is selected by the one of the multiple users from the search results web page.

4. The method of claim 1 wherein determining a respective strength of relationship score between each candidate document in the group of candidate documents and each first document of the first documents further comprises using a popularity of the candidate document to normalize the respective strength of relationship score.

5. The method of claim 1 further comprising:
identifying documents responsive to the query as the first documents; and
generating an augmented set of documents responsive to the query, by the augmented set of documents including one or more of the second documents in and the first documents.

6. The method of claim 5, further comprising:
receiving the query; and
presenting the augmented set of documents in response to the received query.

7. The method of claim 1, further comprising:
selecting the first documents from documents a first user has viewed for a second period of time; and
presenting the one or more second documents as suggested documents.

8. The method of claim 1 wherein the strength of relationship score is a probability that the candidate document will be viewed given that the first document has been presented to a user on a search results web page in response to a query.

9. The method of claim 1 wherein the respective strength of relationship score is a count of the users who viewed the candidate document during the window of time after the first document was presented divided by a count of the users who viewed the first document.

10. The method of claim 1, further comprising:
receiving input from a second user indicating that one or more of the first documents are preferred documents;
calculating a respective document weight for each of the preferred documents; and
wherein calculating the aggregate strength of relationship score for each candidate document includes weighting the strength of relationship scores for the candidate document and each of the preferred documents by the respective document weight for the preferred document.

11. The method of claim 1 wherein the aggregated user selection data for the multiple users comprises a sum of weights wherein each weight corresponds to a presentation of the first document to a user or selection of the first document by the user, and wherein the respective strength of relationship score is the sum of weights divided by the total number of times the source document was presented.

12. The method of claim 1 wherein calculating the aggregate strength of relationship score for each candidate document from the respective strength of relationship scores for the candidate document further comprises scaling the aggregate strength of relationship score for the candidate document.

13. The method of claim 1 wherein calculating an aggregate strength of relationship score for each candidate document from the respective strength of relationship scores for the candidate document further comprises normalizing the aggregate strength of relationship score by a popularity of the candidate document.

14. The method of claim 1 wherein calculating an aggregate strength of relationship score for each candidate document from the respective strength of relationship scores for the candidate document further comprises normalizing the aggregate strength of relationship score by subtracting a logarithm of a popularity of the candidate document from a sum of logarithms of the respective strength of relationship scores for the candidate document.

15. A system for identifying one or more second documents related to one or more documents of a set of first documents, the system comprising:
one or more computers configured to perform operations comprising:
aggregating user selection data for multiple users, the first documents and a group of candidate documents being in a corpus of web documents, the user selection data indicating, for each of the multiple users, whether the user viewed one of the candidate documents during a window of time after a search result corresponding to one of the first is documents was presented to the user on a search results web page in response to a query;
determining, using the aggregated user selection data, a respective strength of relationship score between each candidate document in the group of candidate documents and each first document in the set of first documents, each respective strength of relationship score being determined based on whether each user of the multiple users viewed the candidate document during the window of time after a search result corresponding to the first document was presented to the user on a search results web page in response to a query;
calculating an aggregate strength of relationship score for each candidate document from the respective strength of relationship scores for the candidate document; and
selecting the one or more second documents from the candidate documents according to the aggregate strength of relationship scores for the candidate documents.

16. The system of claim 15 wherein the user selection data further indicates whether each of the multiple users viewed the candidate document for a threshold period of time.

17. The system of claim 15 wherein aggregating user selection data further comprises scaling the user selection data for one of the multiple users by a scoring factor when the one of the multiple users views the candidate document during the window of time after the first document is selected by the one of the multiple users from the search results web page.

18. The system of claim 15 wherein determining a respective strength of relationship score between each candidate document in the group of candidate documents and each first document of the first documents further comprises using a popularity of the candidate document to normalize the respective strength of relationship score.

19. The system of claim 15 wherein the operations further comprise:
identifying documents responsive to the query as the first documents; and
generating an augmented set of documents responsive to the query, the augmented set of documents including one or more of the second documents and the first documents.

20. The system of claim 19 wherein the operations further comprise:
receiving the query; and
presenting the augmented set of documents in response to the received query.

21. The system of claim 15 wherein the operations further comprise:
selecting the first documents from documents a first user has viewed for a second period of time; and
presenting the one or more second documents as suggested documents.

22. The system of claim 15 wherein the strength of relationship score is a probability that the candidate document will be viewed given that the first document has been presented to a user on a search results web page in response to a query.

23. The system of claim 15 wherein the respective strength of relationship score is a count of the users who viewed the candidate document during the window of time after the first document was presented divided by a count of the users who viewed the first document.

24. The system of claim 15 wherein the operations further comprise:
- receiving input from a second user indicating that one or more of the first documents are preferred documents;
- calculating a respective document weight for each of the preferred documents; and
- wherein calculating the aggregate strength of relationship score for each candidate document includes weighting the strength of relationship scores for the candidate document and each of the preferred documents by the respective document weight for the preferred document.

25. The system of claim 15 wherein the aggregated user selection data for the multiple users comprises a sum of weights wherein each weight corresponds to a presentation of the first document to a user or selection of the first document by the user, and wherein the respective strength of relationship score is the sum of weights divided by the total number of times the source document was presented.

26. The system of claim 15 wherein calculating the aggregate strength of relationship score for each candidate document from the respective strength of relationship scores for the candidate document further comprises scaling the aggregate strength of relationship score for the candidate document.

27. The system of claim 15 wherein calculating an aggregate strength of relationship score for each candidate document from the respective strength of relationship scores for the candidate document further comprises normalizing the aggregate strength of relationship score by a popularity of the candidate document.

28. The system of claim 15 wherein calculating an aggregate strength of relationship score for each candidate document from the respective strength of relationship scores for the candidate document further comprises normalizing the aggregate strength of relationship score by subtracting a logarithm of a popularity of the candidate document from a sum of logarithms of the respective strength of relationship scores for the candidate document.

29. A non-transitory computer storage medium having instructions stored thereon that, when executed by data processing apparatus, cause the data processing apparatus to perform operations comprising:
- aggregating user selection data for multiple users, the first documents and a group of candidate documents being in a corpus of web documents, the user selection data indicating, for each of the multiple users, whether the user viewed one of the candidate documents during a window of time after a search result corresponding to one of the first documents was presented to the user on a search results web page in response to a query;
- determining, using the aggregated user selection data, a respective strength of relationship score between each candidate document in the group of candidate documents and each first document in the set of first documents, each respective strength of relationship score being determined based on whether each user of the multiple users viewed the candidate document during the window of time after a search result corresponding to the first document was presented to the user on a search results web page in response to a query;
- calculating an aggregate strength of relationship score for each candidate document from the respective strength of relationship scores for the candidate document; and
- selecting the one or more second documents from the candidate documents according to the aggregate strength of relationship scores for the candidate documents.

* * * * *